US009719286B2

(12) United States Patent
Wall et al.

(10) Patent No.: US 9,719,286 B2
(45) Date of Patent: Aug. 1, 2017

(54) PORTABLE LOW COST FIREARM SAFE

(71) Applicant: Rocky Mountain Safe Company, LLC, Washington, UT (US)

(72) Inventors: Ross B. Wall, Washington, UT (US); Micheal M. Austin, Libertyville, IL (US)

(73) Assignee: Rocky Mountain Safe, Washington, UT (US)

( * ) Notice: Subject to any disclaimer, the term of this patent is extended or adjusted under 35 U.S.C. 154(b) by 0 days.

(21) Appl. No.: 14/686,636

(22) Filed: Apr. 14, 2015

(65) Prior Publication Data

US 2015/0284986 A1 Oct. 8, 2015

Related U.S. Application Data

(63) Continuation-in-part of application No. 14/169,497, filed on Jan. 31, 2014, now Pat. No. 9,007,170, which (Continued)

(51) Int. Cl.

| | |
|---|---|
| ***G05B 19/00*** | (2006.01) |
| ***E05G 1/10*** | (2006.01) |
| ***E05G 1/02*** | (2006.01) |
| ***E05B 65/00*** | (2006.01) |
| ***E05B 47/00*** | (2006.01) |
| ***E05B 43/00*** | (2006.01) |
| ***A47B 81/00*** | (2006.01) |
| ***G07C 9/00*** | (2006.01) |
| ***E05G 1/00*** | (2006.01) |

(Continued)

(52) U.S. Cl.

CPC .............. *E05G 1/10* (2013.01); *A47B 81/005* (2013.01); *E05B 43/005* (2013.01); *E05B 47/00* (2013.01); *E05B 65/0075* (2013.01); *E05G 1/005* (2013.01); *E05G 1/02* (2013.01); *E05G 1/024* (2013.01); *G07C 9/00126* (2013.01); *E05B 2047/0072* (2013.01); *E05F 15/77* (2015.01); *Y10T 70/5031* (2015.04); *Y10T 70/625* (2015.04); *Y10T 70/70* (2015.04); *Y10T 70/7006* (2015.04)

(58) Field of Classification Search

CPC .. E05G 1/10; E05G 1/005; E05G 1/02; E05G 1/024; E05B 43/005; E05B 47/00; E05B 65/0075; E05B 2047/0072; A47B 81/005; G07C 9/00125; E05F 15/77; Y10T 70/5031; Y10T 70/625; Y10T 70/70; Y10T 70/7006

USPC ............................................................ 340/5.1

See application file for complete search history.

(56) References Cited

U.S. PATENT DOCUMENTS

| | | | | |
|---|---|---|---|---|
| 5,701,770 A * | 12/1997 | Cook | ...................... | E05B 47/02 206/1.5 |
| 6,260,300 B1 * | 7/2001 | Klebes | .................. | F41A 17/066 206/317 |

(Continued)

*Primary Examiner* — Hai Phan
*Assistant Examiner* — Zhen Y Wu
(74) *Attorney, Agent, or Firm* — Kunzler Law Group

(57) ABSTRACT

A gun safe includes an enclosing structure and a communication module. The enclosing structure substantially encloses a firearm. The communication module is coupled to the enclosing structure. The communication module facilitates electronic communication with a user device to set two or more access variables to determine at least one access parameter to access the gun safe.

20 Claims, 18 Drawing Sheets

Related U.S. Application Data is a continuation-in-part of application No. 13/469,359, filed on May 11, 2012, now Pat. No. 8,770,117.

(60) Provisional application No. 61/914,819, filed on Dec. 11, 2013.

(51) Int. Cl.

| | |
|---|---|
| ***E05G 1/024*** | (2006.01) |
| *E05F 15/77* | (2015.01) |

(56) References Cited

U.S. PATENT DOCUMENTS

| | | | | | |
|---|---|---|---|---|---|
| 2003/0022657 | A1* | 1/2003 | Herschberg | G06F 8/60 | 455/414.1 |
| 2003/0023855 | A1* | 1/2003 | Keogh | E05B 65/0075 | 713/186 |
| 2004/0066275 | A1* | 4/2004 | Mickler | F41C 33/06 | 340/5.33 |
| 2006/0179057 | A1* | 8/2006 | Moretti | G07C 9/00166 | |
| 2007/0013478 | A1* | 1/2007 | Crigger | A47B 81/005 | 340/5.53 |
| 2007/0241010 | A1* | 10/2007 | Giebel | A47B 81/00 | 206/317 |
| 2008/0252412 | A1* | 10/2008 | Larsson | B60R 25/25 | 340/5.2 |
| 2008/0252414 | A1* | 10/2008 | Crigger | G07C 9/00158 | 340/5.52 |
| 2009/0165682 | A1* | 7/2009 | Cleveland | G06F 21/86 | 109/23 |
| 2010/0176917 | A1* | 7/2010 | Bacarella | E05B 47/026 | 340/5.6 |
| 2010/0243492 | A1* | 9/2010 | Bulthuis, Jr. | F41C 33/06 | 206/317 |
| 2010/0301996 | A1* | 12/2010 | Stradiota | E05B 47/00 | 340/5.53 |
| 2011/0001407 | A1* | 1/2011 | Stradiota | E05B 65/0075 | 312/237 |
| 2011/0079170 | A1* | 4/2011 | Al-Mutairi | E05G 1/06 | 109/23 |
| 2011/0162564 | A1* | 7/2011 | Heim | E05G 1/005 | 109/48 |
| 2011/0175730 | A1* | 7/2011 | Stevenson | E05B 47/00 | 340/540 |
| 2012/0066756 | A1* | 3/2012 | Vysogorets | G06F 21/34 | 726/9 |
| 2012/0169461 | A1* | 7/2012 | Dubois, Jr. | G07C 9/00571 | 340/5.61 |
| 2012/0229251 | A1* | 9/2012 | Ufkes | E05B 47/0004 | 340/5.26 |
| 2012/0291327 | A1* | 11/2012 | Boutot, Jr. | F41C 33/0263 | 42/70.11 |
| 2013/0025511 | A1* | 1/2013 | Maxwell | E05G 1/04 | 109/59 R |
| 2013/0219978 | A1* | 8/2013 | Konchan | E05B 19/043 | 70/447 |
| 2014/0000495 | A1* | 1/2014 | Spencer | E05G 1/08 | 109/56 |
| 2016/0145902 | A1* | 5/2016 | Kalous | E05B 47/0001 | 700/275 |

* cited by examiner

PORTABLE LOW COST FIREARM SAFE

This application is a continuation-in-part of U.S. patent application Ser. No. 14/169,497, filed on Jan. 31, 2014, which is a continuation-in-part of U.S. patent application Ser. No. 13/469,359, filed on May 11, 2012, and claims the benefit of U.S. Provisional Application No. 61/914,819, filed on Dec. 11, 2013.

BACKGROUND

The present invention relates generally to safes, and more particularly to systems and methods for providing a portable, low-cost, customizable firearm safe that provides quick, quiet and ready access to a firearm based upon sensing user specific electronic, pattern, or biometric information. The present invention further relates to an alert system whereby a firearm safe automatically generates and reports an attempted access event based upon a detection of a condition at the safe such as an access attempt, movement or audio detection, or detecting changes in a specific force of the safe. This allows the present invention to incorporate lower-cost materials due to the enhanced intelligent security of the system.

A firearm is a weapon that launches one or more projectiles at high velocity through confined burning of a propellant. Firearms may include handguns, rifles, shotguns, automatic weapons, semi-automatic weapons, pistols, and revolvers. Firearms are used by various types of individuals and organizations for a wide variety of purposes. For example, a firearm may be used as a hunting tool. Further a firearm may be used as a defensive or offensive tool for military and law enforcement personnel. In some instances, a firearm is kept by a homeowner for home protection against an intruder.

Firearms are inherently dangerous and therefore require special care and handling to prevent unintended injury. Where firearms and children are present within the same home, firearm safety is especially important to prevent unintended consequences of children accessing and playing with firearms. A common practice is to store an unloaded firearm at a first location that is apart from a second location where ammunition for the firearm is stored. This practice is undesirable for several reasons. For example, this practice requires that the ammunition be retrieved and loaded into the firearm prior to using the firearm for home defense. In an emergency situation, this practice results in significant delay by requiring the user to retrieve and load the firearm. Further, this practice does not prevent access to the firearm, and therefore the firearm may be loaded by anyone having their own ammunition, or who has recovered ammunition from the storage location. Further still, great care must be taken to ensure that all ammunition is removed from the firearm following use or loading.

Another practice is place a trigger lock on a loaded firearm. For purposes of child safety, this practice generally requires that the key for the trigger lock be located apart from the loaded firearm. As with the previously mentioned practice, this practice also requires an additional step for readying the firearm for use. In particular, a user must retrieve the key and unlock the trigger lock prior to using the firearm. In an emergency situation, there may be insufficient time or access to the key, thereby rendering the firearm useless in the situation. Further, a child may locate the key and unlock the trigger lock without notice to the parent or firearm owner. Further still, this practice requires that great care be taken to put the trigger lock back onto the firearm after use. In conventional safes intended to secure weapons in homes, the safe itself is either 1) constructed of heavy and expensive materials (usually metals) to make the safe non-portable and secure, or 2) fastened to a surface to restrict portability. This is due to the lack of intelligence which requires purely physical resistance to secure the weapons.

Thus, although systems and methods currently exist for providing limited access to a firearm within a home, challenges still exist. Accordingly, it would be an improvement in the art to augment or even replace current techniques with other techniques.

SUMMARY

The present invention relates generally to safes, and more particularly to systems and methods for providing a dynamic, customizable gun safe that provides quick and ready access to a firearm based upon a dynamic access parameter.

Embodiments of a gun safe are described. In one embodiment, the gun safe includes an enclosing structure and a communication module. The enclosing structure substantially encloses a firearm. The communication module is coupled to the enclosing structure. The communication module facilitates electronic communication with a user device to set two or more access variables to determine at least one access parameter to access the gun safe.

Embodiments of a method are also described. In one embodiment, the method is a method for securing a firearm. The method includes determining at least one access parameter based on two or more access variables. The method also includes detecting a firearm access attempt. The method also includes checking the access attempt against the at least one access parameter. The method also includes providing access to the firearm in response to the access attempt matching the at least one access parameter or denying access to the firearm in response to the access attempt not matching the at least one access parameter.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

BRIEF DESCRIPTION OF THE DRAWINGS

Various features of the present invention will become more fully apparent from the following description and appended claims, taken in conjunction with the accompanying drawings. Understanding that these drawings depict only typical embodiments of the invention and are, therefore, not to be considered limiting of its scope, the embodiments of the invention will be described and explained with additional specificity and detail through the use of the accompanying drawings.

DETAILED DESCRIPTION

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Various embodiments of the present invention may be utilized to provide limited or selective access to the contents of a safe. In particular, various embodiments of the present invention may be utilized to provide access to a firearm within a firearm safe in response to the firearm safe receiving and recognizing previously registered user-identifying electronic, biometric, or other data. Further, various embodiments of the present invention include firearm safes having fire arm adapters whereby to assist in storing the firearm(s) within the firearm safe in an accessible, ready position.

Figure 1:
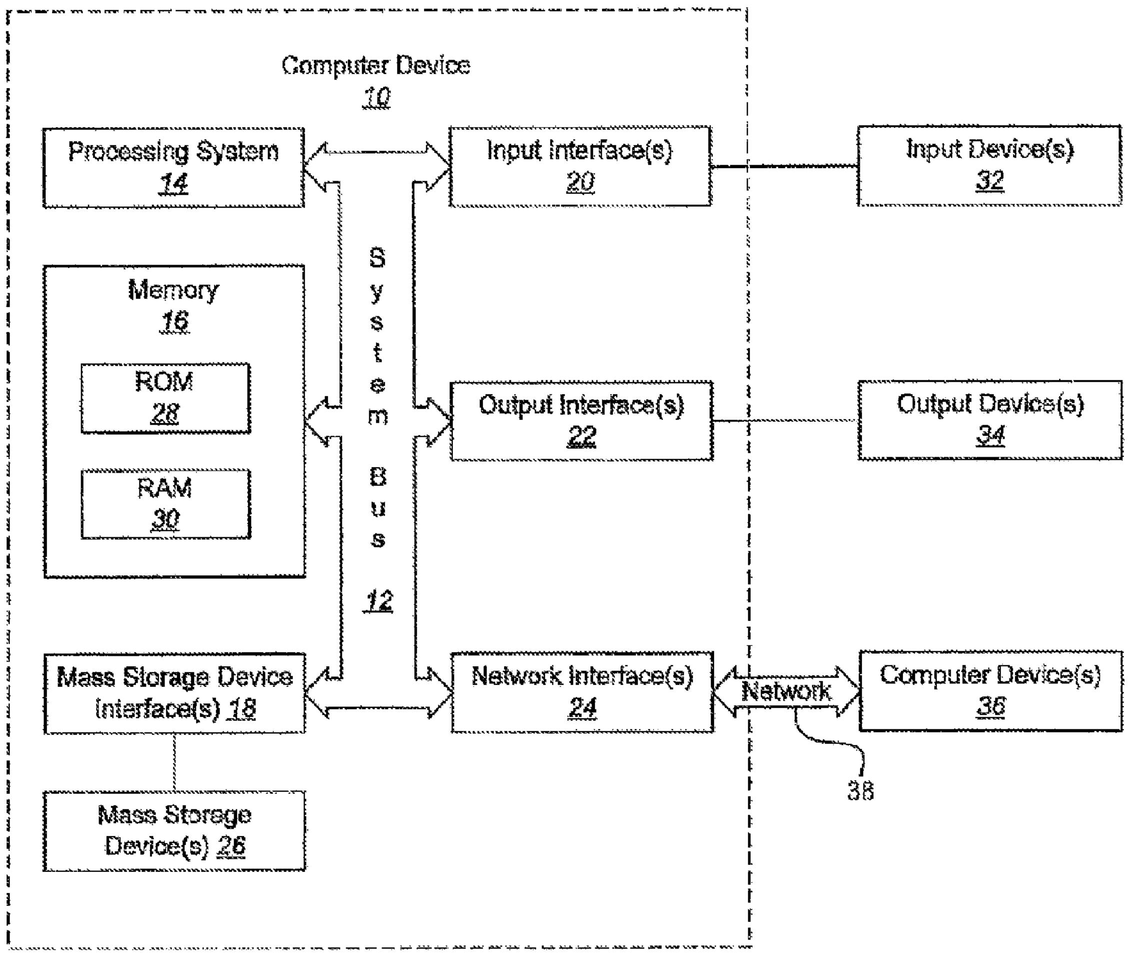
FIG. 1 shows a flow chart of a representative system that provides a suitable operating environment in which various embodiments of the present invention may be implemented.
Figure 2:
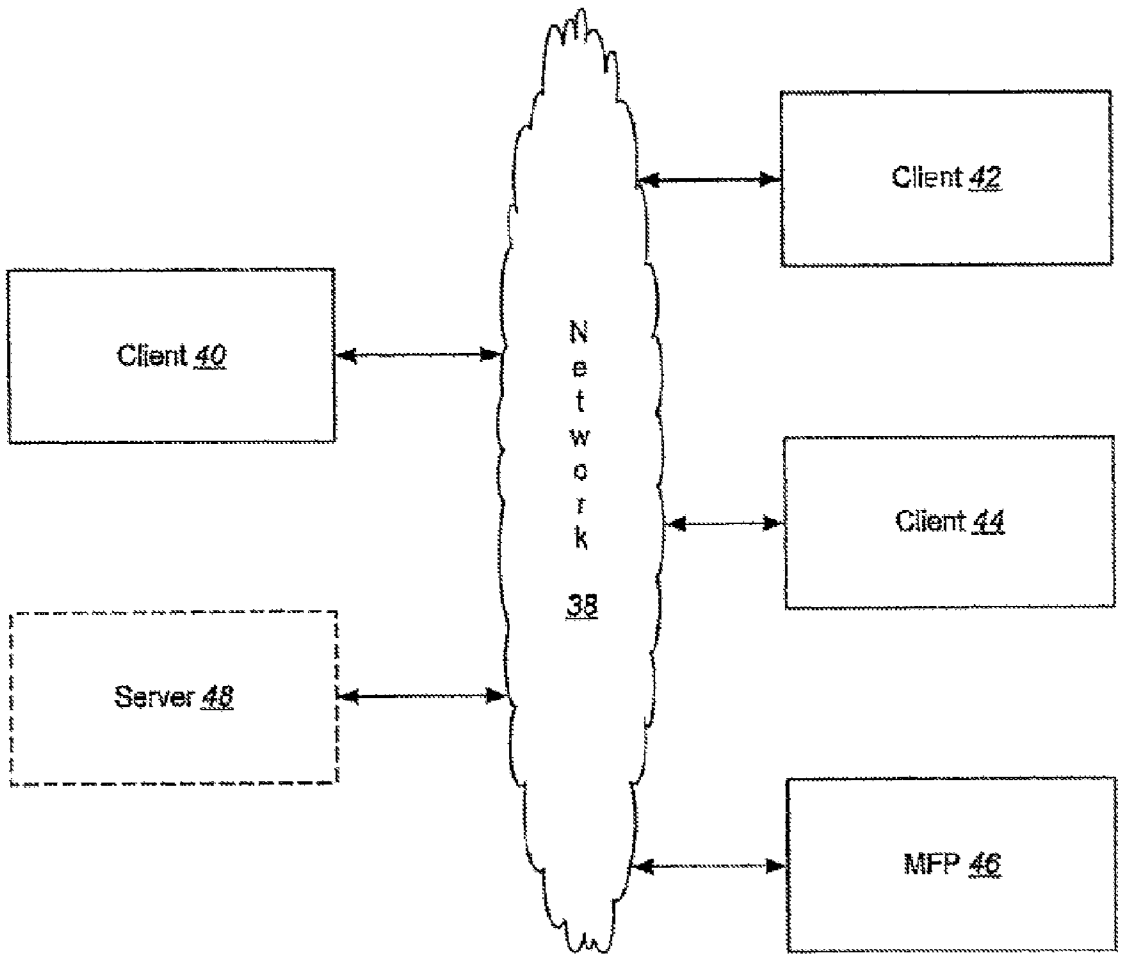
FIG. 2 shows a flow chart of a representative networking system that provides a suitable environment in which various embodiments of the present invention may be implemented.

FIGS. 1 and 2, and the corresponding discussion, provide a general description of a suitable operating environment in which embodiments of the invention may be implemented. One skilled in the art will appreciate that embodiments of the invention may be practiced by one or more computing devices and in a variety of system configurations, including in a networked configuration. However, while the methods and processes of the present invention have proven to be particularly useful in association with a system comprising a general purpose computer, embodiments of the present invention include utilization of the methods and processes in a variety of environments, including embedded systems with general purpose processing units, digital/media signal processors (DSP/MSP), application specific integrated circuits (ASIC), stand alone electronic devices, and other such electronic environments.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing embodiments of the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, a smart phone, a position identifier, a ball collector, or the like.

Computer device 10 may include a system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, thumb drives, solid state memory, a universal serial bus or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, thumb drive tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, capacitive or resistive touch screens, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), an integrated circuit, a firewire (IEEE 1394), or another interface. For example, in some embodiments input interface 20 includes an application specific integrated circuit (ASIC) that is designed for a particular application. In a further embodiment, the ASIC is embedded and connects existing circuit building blocks.

One or more output interfaces 22 may be employed to connect one or more corresponding output devices 34 to system bus 12. Examples of output devices include a monitor or display screen, indicator lights, a speaker, a printer, a multifunctional peripheral, and the like. A particular output device 34 may be integrated with or peripheral to computer device 10. Examples of output interfaces include a video adapter, an audio adapter, a parallel port, a signal antenna such as a radio-frequency antenna, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Thus, while those skilled in the art will appreciate that embodiments of the present invention may be practiced in a variety of different environments with many types of system configurations, FIG. 2 provides a representative networked system configuration that may be used in association with embodiments of the present invention. The representative system of FIG. 2 includes a computer device, illustrated as client 40, which is connected to one or more other computer devices (illustrated as client 42 and client 44) and one or more peripheral devices (illustrated as multifunctional peripheral (MFP) MFP 46) across network 38. While FIG. 2 illustrates an embodiment that includes a client 40, two additional clients, client 42 and client 44, one peripheral device, MFP 46, and optionally a server 48, connected to network 38, alternative embodiments include more or fewer clients, more than one peripheral device, no peripheral devices, no server 48, and/or more than one server 48 connected to network 38. Other embodiments of the present invention include local, networked, or peer-to-peer environments where one or more computer devices may be connected to one or more local or remote peripheral devices. Moreover, embodiments in accordance with the present invention also embrace a single electronic consumer device, wireless networked environments, and/or wide area networked environments, such as the Internet. In some embodiments, the devices may include biometric scanners, input keys, touch screens, RF or other signal based inputs, as well as mechanical locks and access systems. Some embodiments incorporate multiple input systems while others incorporate a single system.

Referring generally to FIGS. 3-6, a safe 100 is provided having an interior space 104 to which limited access is provided. Some embodiments of the present invention provide a safe 100 having collapsible walls 110 which retract or move in response to receiving a pre-registered access parameter or other pre-registered information from an authorized user. As used herein, the term "access parameter" is understood to include any event, action, motion, or information detected or sensed by safe 100. Access parameters may include user-specific electronic, pattern, biometric or other identifying information, a change in a specific force of safe, contact with the safe by an authorized or unauthorized user, an audible signal, a password sequence, a pattern sequence, or other information which may indicate an attempt to access the safe. One having skill in the art will appreciate that the term "access parameter" may include any single parameter or combination of multiple parameters which may be used to detect or identify an attempt to access or move the safe, or any portion of the safe.

In some instances, safe 100 includes a biometric sensor 102 which is positioned on safe 100 in an accessible location, for example on a top surface or cap 120 of safe 100. Upon recognition of a pre-registered identifying parameter, collapsible walls 110 rotate to an open position thereby providing access to an interior space of safe 100. In some embodiments, collapsible walls 110 rotate silently and quickly to provide instantaneous and quiet access to the interior space of safe 100. The specific mechanisms by which collapsible walls 110 operates will be discussed in further detail below.

In some embodiments, safe 100 comprises a back plate 130 which provides an immobile enclosure or back wall of safe 100. Back plate 130 may include any size and/or dimensions as may be desirable to accommodate a length and width of an object to be stored within safe 100. In some embodiments, back plate 130 comprises side flanges 132 which extend outwardly to provide a channel 134. Channel 134 is sized and configured to compatibly receive cap 120 and base 140, as shown. In particular, in some embodiments cap 120 comprises side brackets 122 which interface with side flanges 132, and are coupled thereto via fasteners 134. Similarly, base 140 comprises side brackets 142 which are inserted within channel 134 and coupled to side flanges 132 via fasteners 134. Once secured, back plate 130, cap 120, and base 140 provide a body of safe 100.

Cap 120 may include any size, shape, dimensions and/or configuration to compatibly seat within channel 134 of back plate 130. In some embodiments, cap 120 comprises a pie or wedge-shape having a point 124 on which is mounted a pin 126 or socket (not shown) for forming a pivot point connection with collapsible walls 110. Accordingly, point 124 and pin 126 extend outwardly from side brackets 122 to a position which is approximately centered over support surface 106 of base 140. Further, collapsible wall 110 comprise a socket 112 or pin (not shown) to compatibly receive pin 126 in a pivotal manner.

Figure 3:
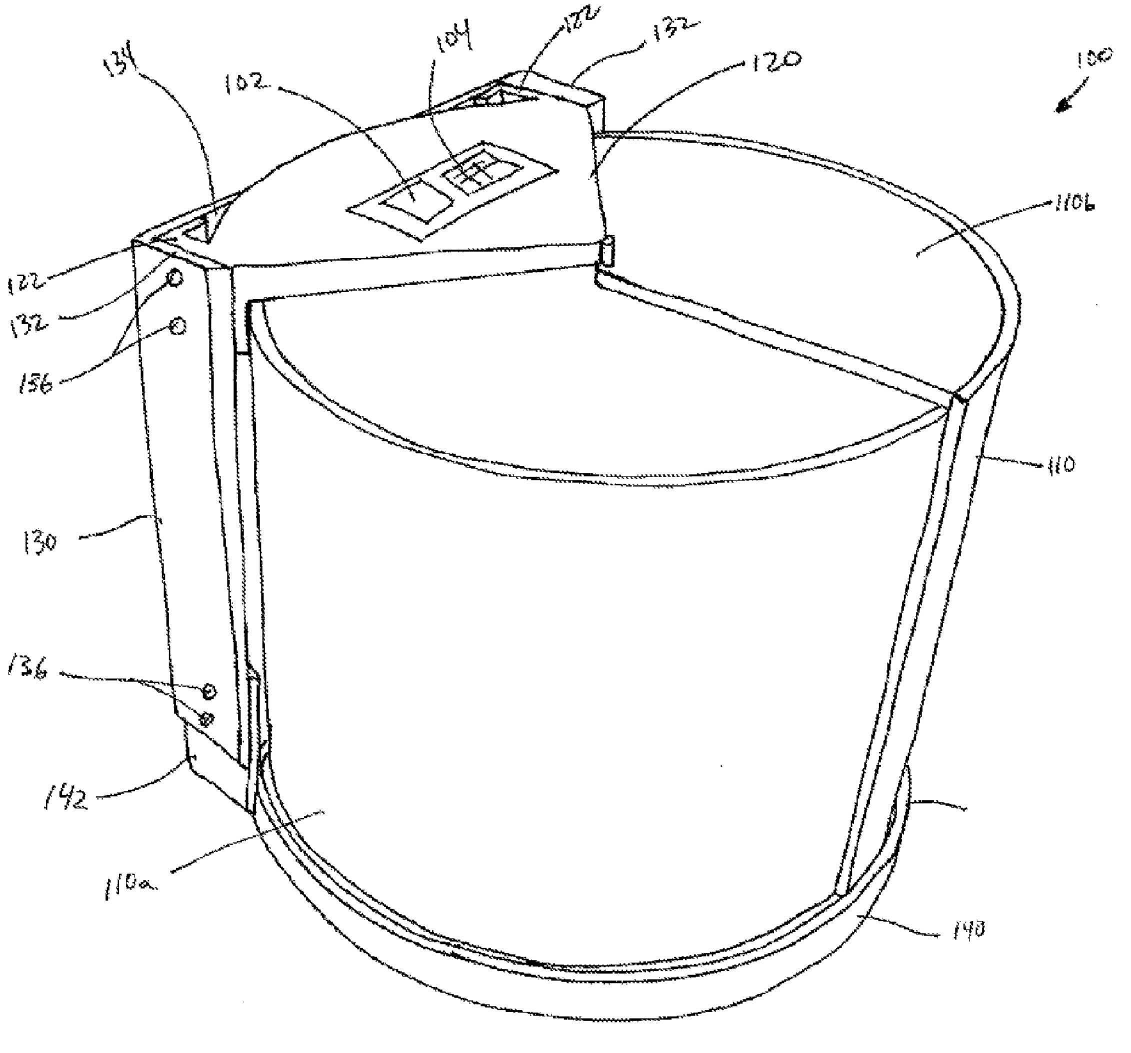
FIG. 3 shows a perspective view of a firearm safe in a closed configuration in accordance with a representative embodiment of the present invention.
Figure 4:
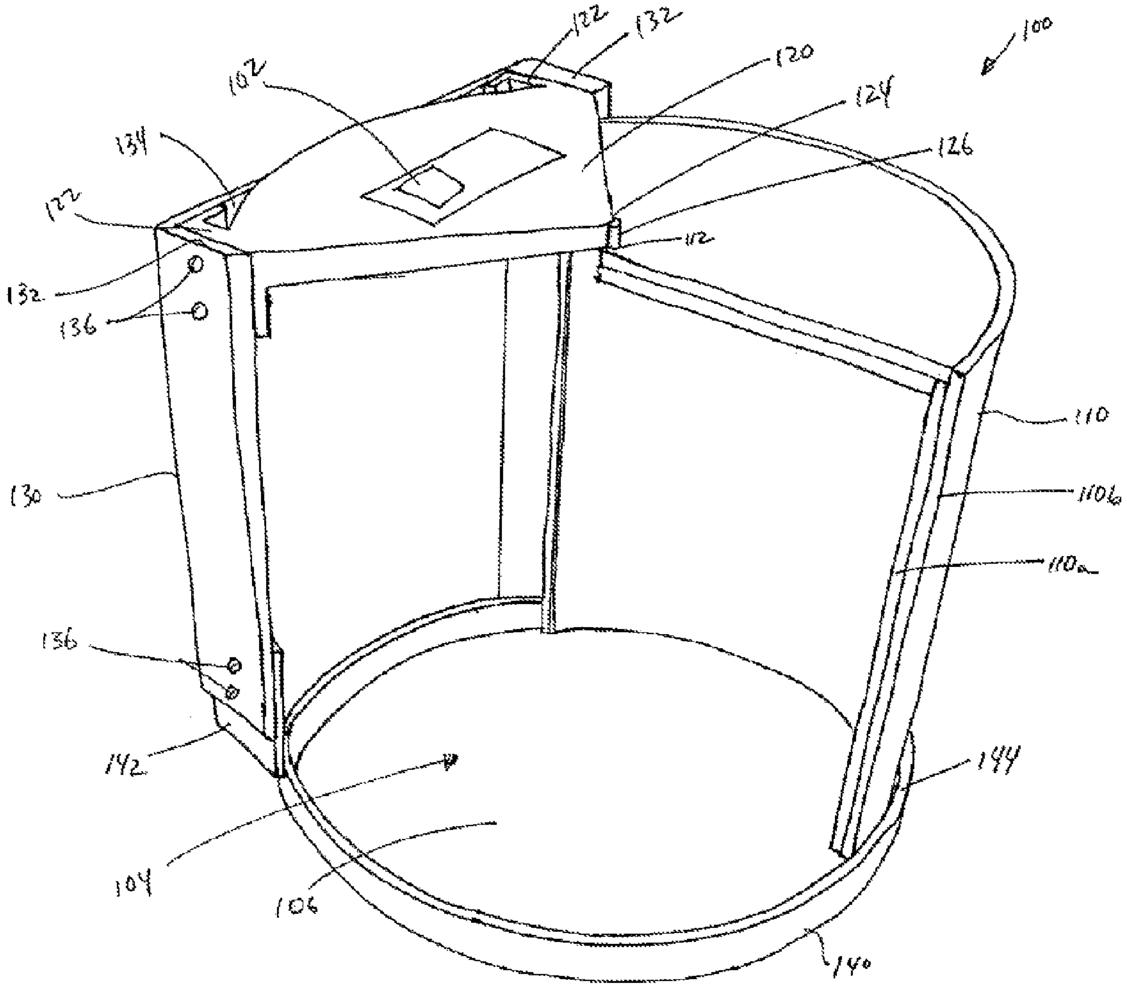
FIG. 4 shows a perspective view of a firearm safe in a partially opened configuration in accordance with a representative embodiment of the present invention.
Figure 5:
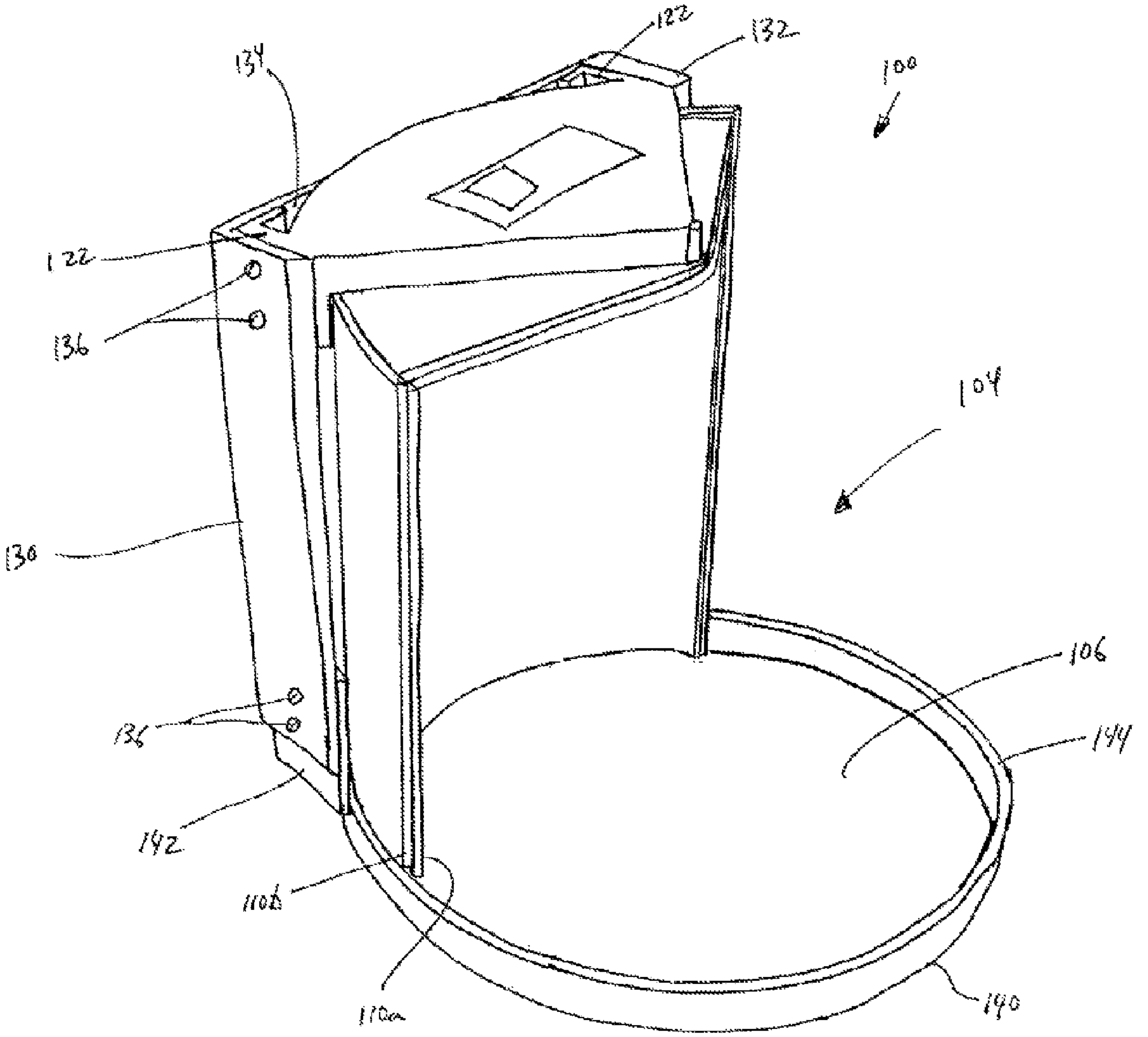
FIG. 5 shows a perspective view of a firearm safe in an opened configuration in accordance with a representative embodiment of the present invention.
Figure 6:
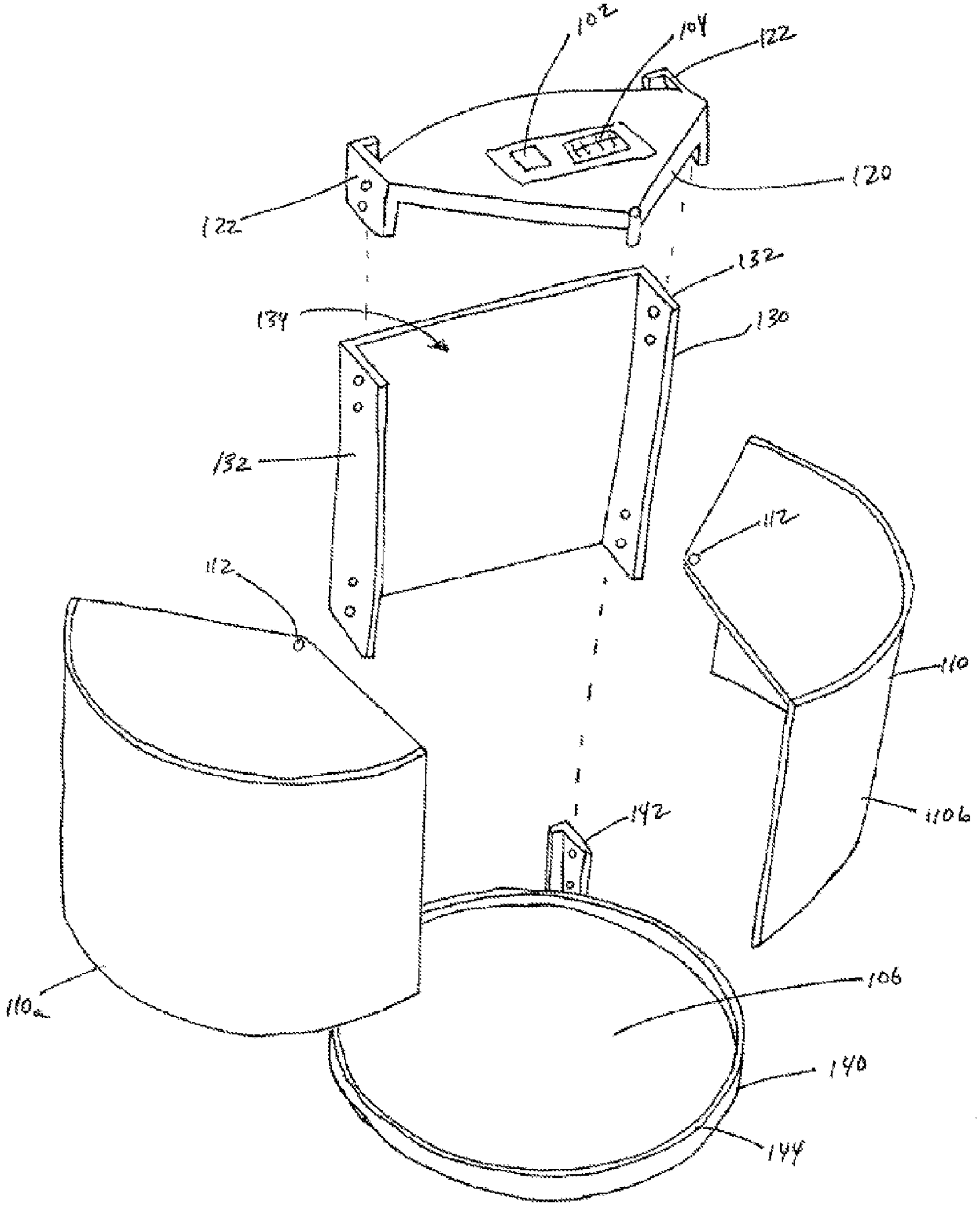
FIG. 6 is an exploded perspective view of a firearm safe in accordance with a representative embodiment of the present invention.

Cap 120 further comprises a sensor 102 which is positioned on cap 120 so as to be easily accessible to an authorized user for input of an access parameter. In some instances, cap 120 further comprises a motor and various drive gears (not shown) which are provided to move collapsible walls 110 from a closed position, as shown in FIG. 3, to an opened position, as shown in FIGS. 4 and 5. In other embodiments, cap 120 comprises a lock mechanism (not shown) which secures collapsible walls 110 in a closed position prior to sensor 102 receiving and recognizing an access parameter of an authorized user. In some embodiments, collapsible walls 110 are manually opened by an authorized user after being unlocked in response to receiving a pre-registered access parameter.

Some embodiments of the present invention comprise collapsible walls which are operated via an electrical motor in response to receiving an authorized access parameter. In other embodiments, a safe is provided having collapsible wall which are operated via gravity. For example, a safe may include a collapsible wall which is held in closed position via a locking mechanism. Upon receiving an authorized access parameter, the locking mechanism releases the collapsible wall thereby allowing the collapsible wall to fall to an opened position under the force of gravity. The safe may further include pneumatic pistons or friction contacts whereby to control the rate at which the collapsible wall is permitted to open under the force of gravity, as may be desired.

Sensor 102 may be configured to receive and recognize any input parameter useful in identifying an authorized user. For example, in some embodiments sensor 102 is configured to receive and recognize a fingerprint of an authorized user. In other embodiments, sensor 102 is configured to receive and recognize the voice of an authorized user. Sensor 102 may further be configured to receive and recognize a retinal scan of an authorized user.

In some instances, biometric sensor 102 is configured to recognize a pre-registered biometric perimeter of an authorized user. For example, an authorized user may access and initiate a training protocol with sensor 102, whereby the authorized user teaches sensor 102 to recognize and identify a specific biometric parameter of the authorized user. In some embodiments, a training protocol for sensor 102 is initiated by entering a password code or other code sequence using a keypad 104 or touch screen (not shown). The authorized user registers their access parameter with sensor 102, whereupon the parameter is stored within sensor 102 for subsequent comparison upon receiving an input parameter. Upon receiving a parameter, the parameter is compared to the pre-registered parameter to determine an authorization to the interior space 104 of safe 100. Where the received parameter matches the pre-registered parameter, the locking mechanism of cap 120 is released thereby providing access to interior space 104. However, where the received parameter does not match the pre-registered parameter, the locking mechanism of cap 120 is not released, thereby preventing access to interior 104 of safe 100.

Safe 100 may further be accessed by entering a password or other code which has been established and pre-registered by an authorized user. For example, safe 100 may include a touch screen whereby a user may pre-register a numeric password or pattern sequence to identify the authorized user to safe 100. Upon correctly entering the password or pattern sequence, the locking mechanism of cap 120 is released, thereby granting access to interior space 104. The safe 100 may also include an antenna for detection of a signal, such as an RF signal, identifying the user or initiating a prompt for the user to input a personal access parameter.

In some embodiments, safe 100 further comprises an accelerometer which measures or detects changes in a specific force, or g-force of safe 100. As such, safe 100 may detect contacted by an authorized or unauthorized user. For example, in some embodiments an accelerometer detects contact between a person and any surface of safe 100. In other embodiments, an accelerometer detects contact between a person and a specified surface of safe 100, such as sensor 102 or collapsible wall 110. An accelerometer may further detect movement of safe 100. For example, an accelerometer may detect when an attempt is made to move or lift safe 100. In some instances, safe 100 includes an integrated biometric sensor and accelerometer.

In some embodiments, safe 100 further comprises one or more mounting brackets to facilitate mounting of safe 100 to a desired surface or at a desired location. For example, safe 100 may include a mounting bracket for securing safe 100 to a wall, a cabinet, a shelf, a trunk space of an automobile, or a mantle. Safe 100 may further include various settings or mounting holes for attaching a mounting bracket to safe 100 in a desired location and/or orientation.

Base 140 forms a bottom enclosure for safe 100 and comprises a shape and dimensions as may be desired and which is compatible for use with cap 120 and collapsible walls 110. For example, in some embodiments the base 140 comprises a circular shape having a support surface 106 to accommodate collapsible walls 110. In other embodiments, the base 140 comprises a square or rectangular shape, wherein cap 120 and collapsible walls 110 are similarly or compatibly shaped. Base 140, cap 120 and collapsible walls 110 may include any size, shape and/or dimensions as may be desirable.

Base 140 provides a bottom enclosure for safe 100 and defines a bottom boundary of interior space 104. In some embodiments, the base 140 further comprises a lip or flange 144 which forms a perimeter of base 110. Flange 144 extends upwardly from base 140 to define the perimeter of support surface 166. Flange 144 is generally configured such that collapsible walls 110 are positioned within or interior to flange 144 and adjacent support surface 106. Thus, flange 144 prevents access to interior space 104 via any space between collapsible walls 110 and support surface 106, when in a closed position.

Collapsible wall 110 may include any size, shape and/or configuration compatible with the teachings of the present invention. In general, a collapsible wall comprises a top surface, a bottom rim and a wall surface extending therebetween. Thus, the support surface 106, the back plate 130, the cap 120, and the top surfaces and wall surfaces of collapsible wall 110 define the interior space 106 of safe 100.

In some embodiments, collapsible wall 110 comprises a single wall that is positioned to block an opening to interior space 106. Thus, upon receiving a pre-registered biometric parameter, the single wall is retracted or otherwise removed from obstructing the opening to the interior space 106, thereby providing access to the contents stored within interior space 106. For example, in some embodiments collapsible wall 110 comprises a single trap door that is released and thereby falls open to provide access to interior space 106. In other embodiments, collapsible wall 110 comprises a multi-segmented wall that, when release by a locking mechanism, folds along the individual segments and collapses to provide access to interior space 106.

Collapsible wall 110 may further include a single, pie-shaped wall segment that is pivotally suspended from cap 120, wherein a bottom rim of the wall 110 is positioned adjacent to support surface 104 of base 140. Collapsible wall 110 is rotated about pivot point 126 of cap 120 to provide access to interior space 106. In some embodiments, collapsible wall 110 is pivoted and/or rotated about pivot point 126 such that collapsible wall 110 is partially nested within channel 134 of back plate 130.

Collapsible wall 110 may further include a plurality of collapsible wall sections 110*a* and 110*b*. Sections 110*a* and 110*b* are pivotally suspended from cap 120 via pivot point 126. In some embodiments, section 110*a* is sized to compatibly nest within the concave interior of section 110*b*. Thus, upon being released from a locking mechanism of cap 120, section 110*a* is rotated and nested within section 110*b*, and sections 110*a* and 110*b* are rotated and nested within channel 134 of back plate 130. Collapsible wall 110 may further include a plurality of individual sections which are similarly configured and arranged, as may be desirable.

Some embodiments of safe 100 comprise a system whereby the overall height of safe 100 may be adjusted to accommodate storage of a firearm within interior space 104. For example, in some embodiments back plate 130 is removed from cap 120 and base 140 and replaced with a back plate having a different, desired height. Further, collapsible walls 110 are removed and replace with collapsible walls having a height which is compatible with the replacement back plate. The replacement back plate and collapsible walls may increase or decrease the overall height of safe 100. As such, safe 100 may be configured to store a hand gun or a shotgun dependent upon the dimensions of back plate 130 and collapsible walls 110.

Safe 100 may include any material or combination of materials which are designed to provide a level of security intended for safe 100. For example, in some embodiments safe 100 comprises a metallic material, such as steel, stainless steel, aluminum, titanium, cobalt, and/or combinations or alloys thereof. In other embodiments, safe 100 comprises a rigid, nonmetallic material, such as Kevlar, high density polyethylene, carbon fiber, and/or polycarbonate. The material of safe 100 may further be selected to reduce the overall weight of safe 100, thereby providing a portable safe device.

In some embodiments, safe 100 further comprises a computer executable software program whereby unauthorized attempts to access interior space 104 are communicated to an authorized user, or other designated contact. For example, in some embodiments sensor or accelerometer 102 comprises circuitry for communicating with a computer device or smart device of an authorized user to alert the authorized user of the unauthorized attempt or contact with safe 100. Safe 100 may thus be configured to send a text message, an email message, or call a phone number associated with the authorized user. The authorized user is thus apprised of the unauthorized attempt and may take action, as necessary.

In some instances, safe 100 comprises a computer executable software program whereby any contact or access attempts to safe 100 (authorized or unauthorized) are communicated to an authorized user, or other designated contact, such as a law enforcement personnel. In other instances, safe 100 comprises hardware and software which links the safe's activity into a home security system of the authorized user. Any attempts to access safe 100, either through general contact with safe 100 or sensor 102, are sent to the home security system as "contact data." The home security system may then issue an alert in accordance with the configuration of the home security system. For example, in some instances the home security system initiates an audible and/or visual alert in response to receiving contact data from safe 100. In other instances, the home security system automatically contacts a law enforcement agency or personnel in response to receiving contact data from safe 100. The home security system may further initiate a lockdown sequence of the authorized user's home or other location where safe 100 is located. The home security system may further initiate video monitoring in response to receiving contact data from safe 100. In some instances, a home security system may initiate a pre-recorded audio track or sound in response to receiving contact data from safe 100. For example, the home security system may initiate playback of a recording of a shotgun chambering a round.

Figure 7A:
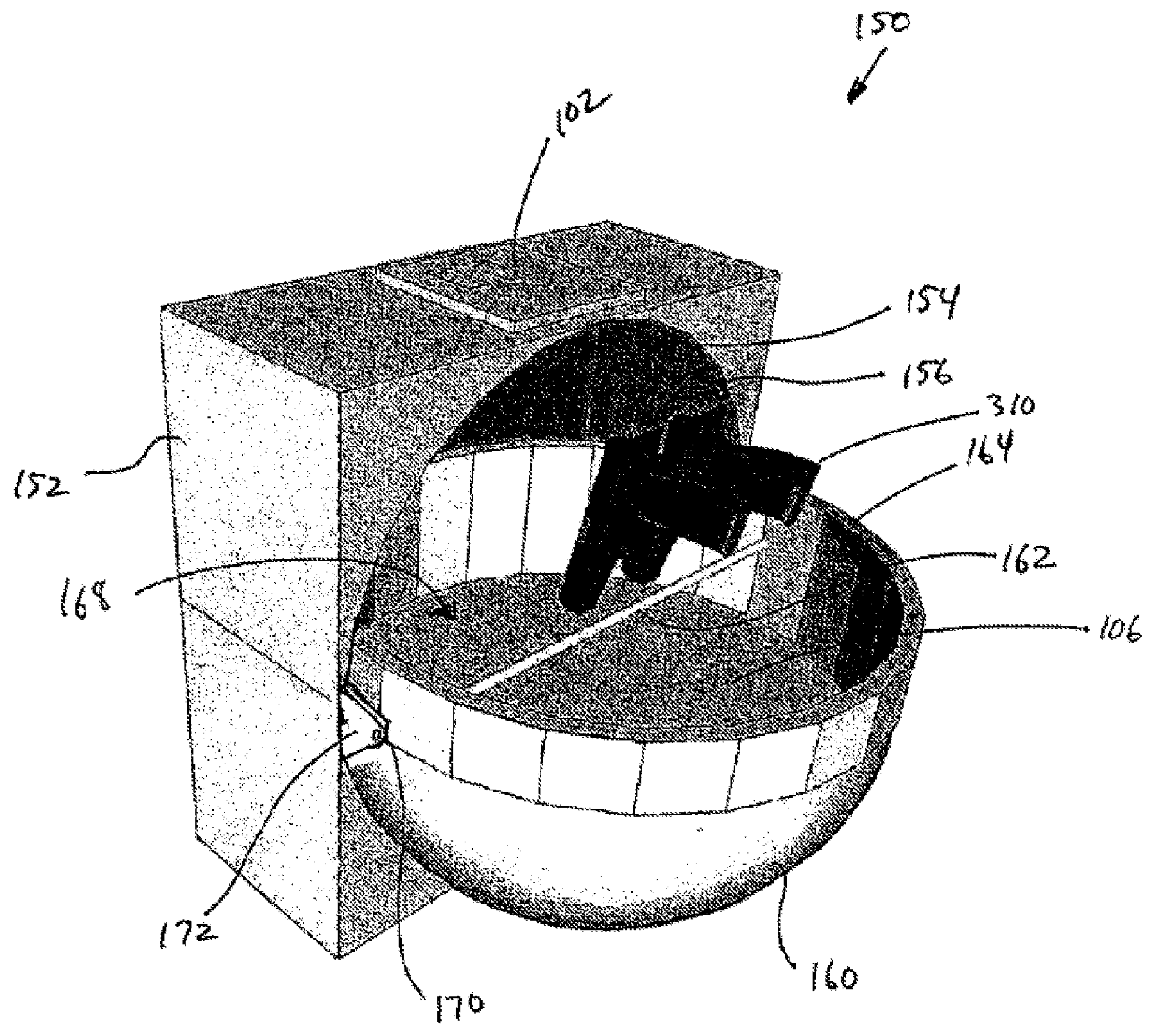
FIG. 7 shown in parts A and B is a perspective view of a firearm safe in opened and closed configurations in accordance with a representative embodiment of the present invention.
Figure 7B:
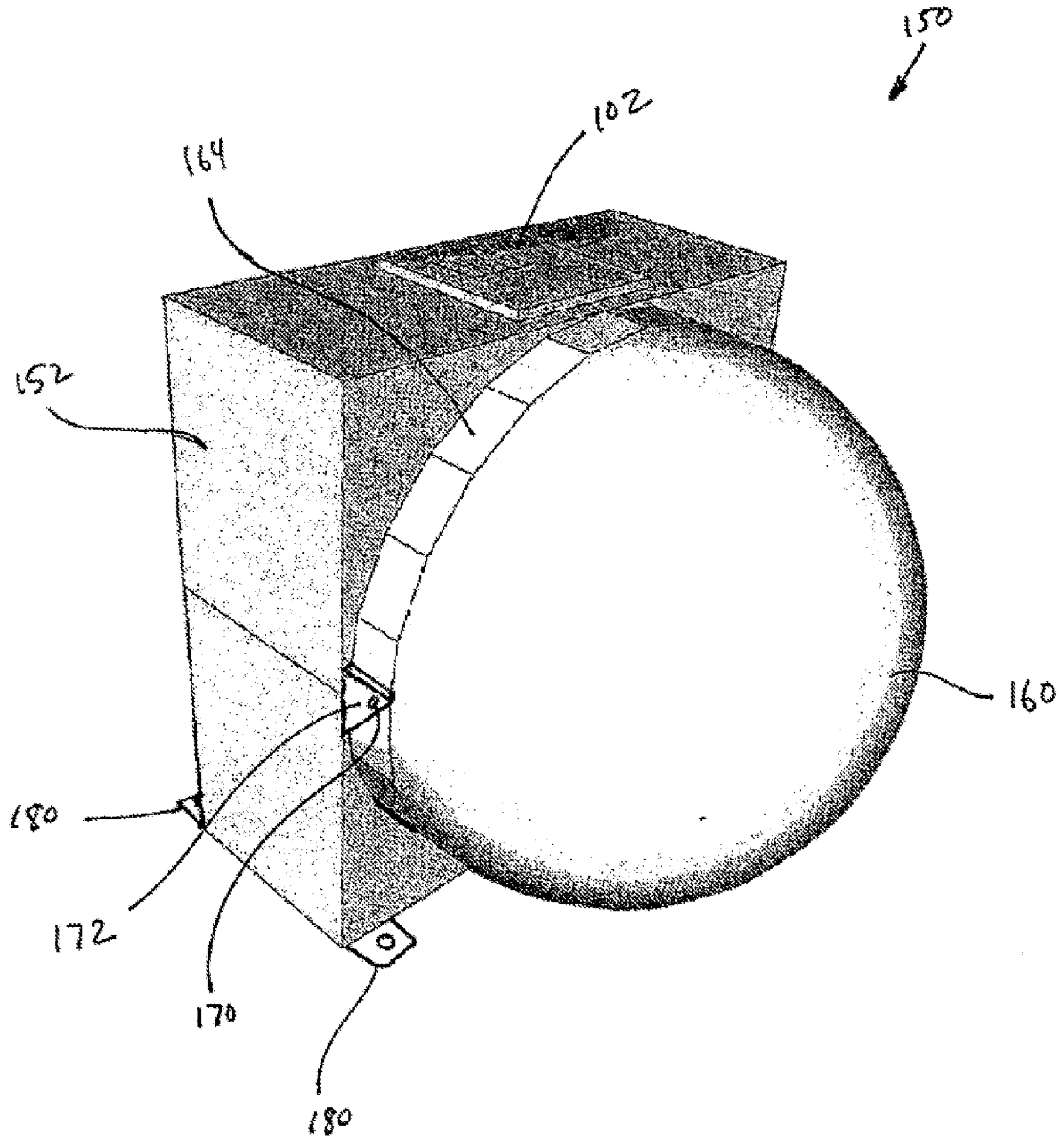

Referring now to FIGS. 7A and 7B, a firearm safe 150 is shown. In some embodiments, a firearm safe 150 is provided having a cabinet 152 which forms a body of the safe. As with the previous embodiments, cabinet 152 may comprise any material which is compatible with the teachings of the present invention. For example, the material may include low-cost, light weight metals, plastic, composites, proprietary materials, such as Kevlar, etc. Cabinet 152 comprises an interior cavity 154 in which is housed a collapsible wall 160. In one embodiment, the cabinet 152 is configured to open in such a way as to retain or reduce the amount of space it occupies as it opens. In other words, the device does not get larger, like a traditional lid or case, as it opens. This allows the cabinet 152 to be stored in potentially tight confines and to open without obstructing the user's access to the firearm or catching on the surroundings. In some embodiments, collapsible wall 160 is connected to cabinet 152 in a pivotal manner such that collapsible wall 160 may pivot around a pivot point 170 between an open position (as shown in FIG. 7A) and a closed position (as shown in FIG. 7B). For example, in some embodiments cabinet 152 comprises a pair of stators 172 which supports collapsible wall 160 via pivot point 170. In some instances, collapsible wall 160 further comprises an axle 162 which is threaded through a rim or sidewall 164 of collapsible wall 160 and stators 172.

Accordingly, collapsible wall 160 is configured to rotate about pivot point 170 to permit or limit access to interior cavity 154.

In some embodiments, stator 172, pivot point 170 and sidewall 164 of collapsible wall 160 are configured such that when collapsible wall 160 is rotated about pivot point 170, sidewall 164 is partially positioned within interior cavity 154 thereby preventing access to interior cavity 154, as shown in FIG. 7B. Accordingly, the diameter of sidewall 164 is less than the diameter of the opening 156 of cabinet 152. Thus, sidewall 164 provides an overlapping protective measure for safe 150 when inserted within opening 156.

In some embodiments, sidewall 164 surrounds a perimeter of collapsible wall 160 thereby defining a support surface 106 and storage space 168. Support surface 106 may further include a firearm stand (not shown) or other support whereby to retain firearm 310 in a zero gravity, or ready position. Alternatively, the firearm stand may be attached to a portion of cabinet 152. For example, a firearm stand may be attached to an inner wall surface of interior cavity 154. Firearms 310 may also be temporarily coupled to axle 162 in a ready position.

Some aspects of the present invention further comprise mounting brackets 180 which are attached to cabinet 152 to permit firearm safe 150 to be temporarily or permanently secured to a desired location. For example, in some embodiments mounting brackets 180 are provided to facilitating mounting of firearm safe 150 within a trunk of an automobile. Mounting brackets 180 may also be provided to permit mounting of firearm safe 150 within a closet, a nightstand, or under a bed. In some embodiments, mounting brackets 180 are interchangeable, such that a user may select a mounting bracket style and configuration to facilitate mounting of safe 150 at a desired location and orientation. For those embodiments which include an accelerometer, safe 100 or 150 may be securely stored without the need of a mounting bracket due to the automated generation of an alert in response to an attempted access or contact with the safe.

As previously discussed, firearm safes of the present invention may comprise lightweight materials, such as non-metallic polymers or composite materials. As such, the safe may be easily transported as desired. For example, a user may remove the firearm safe from their home for storage in their automobile. The user may further remove the firearm safe from their automobile for storage in a hotel room. Thus, unlike conventional safes, the firearm safes of the present invention are highly portable while providing user specific, rapid access to the contents of the safe.

Figure 8:
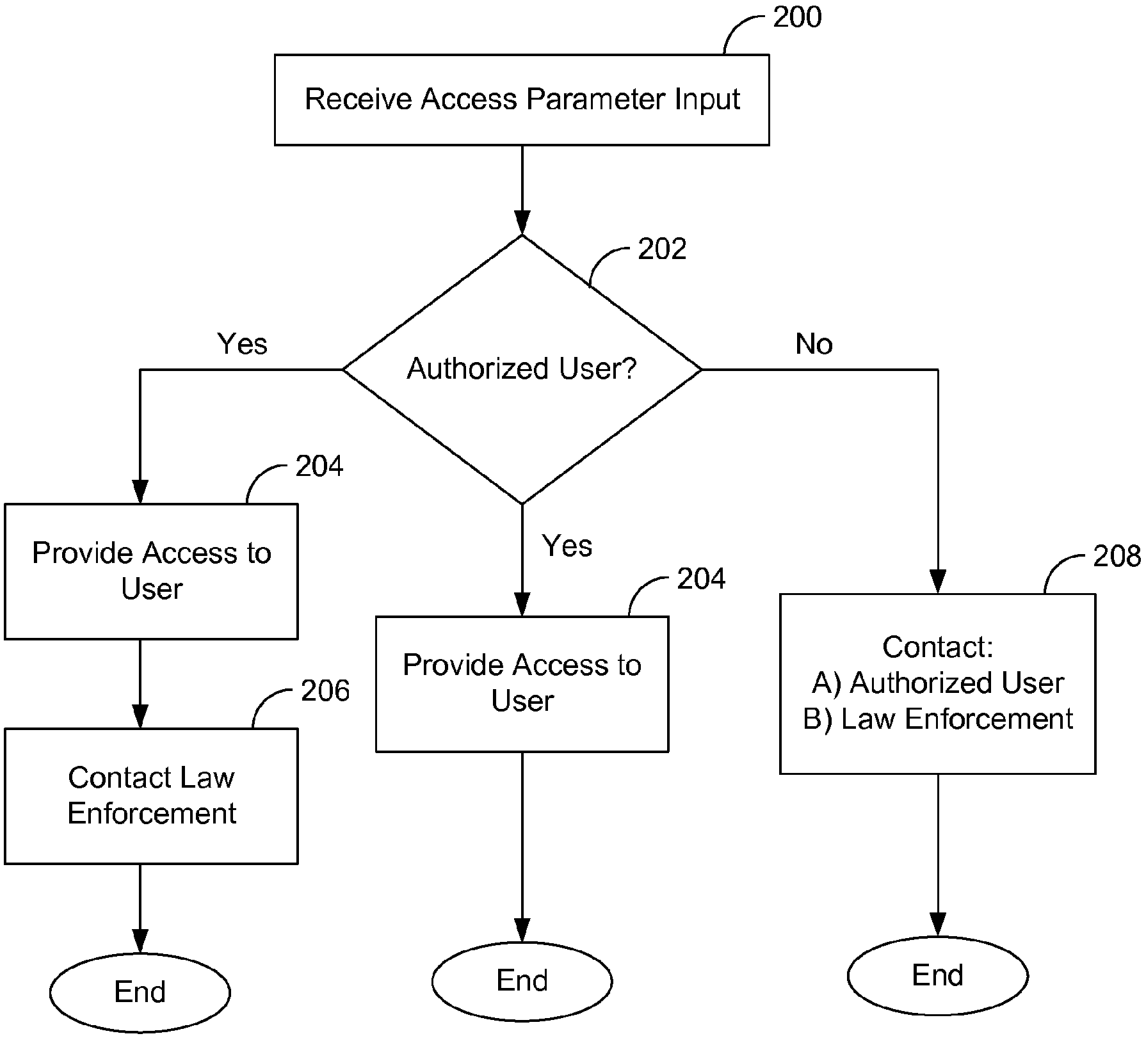
FIG. 8 shows a flow diagram of a computer executable software program method for limiting access to a firearm safe in accordance with a representative embodiment of the present invention.

Referring now to FIG. 8, a computer executable software program method is shown for authorizing or preventing access to a firearm safe of the present invention. In some embodiments, a sensor receives an access parameter or input 200. An access parameter may be received by touching the sensor or otherwise attempting to activate the sensor in any manner in an attempt to gain access to the safe. An access parameter may further be received by contacting any portion of the safe which changes a specific force of the safe, as detected by an accelerometer of the safe. The sensor then analyzes the access parameter to determine if the parameter matches a pre-registered access parameter 202. For example, the sensor may compare the received parameter to a library of stored, pre-registered access parameters. Where the access parameter comprises contact with a surface of the safe, the sensor may simply recognize the access parameter as contact with the safe.

Analysis of the received access parameter input will determine a permission level or authorization for access to the safe. Where the access parameter input matches a pre-registered access parameter, the locking mechanism of the safe is released thereby providing access to the user 204. In some embodiments, a positive match between the received access parameter input and the pre-registered access parameter further initiates contact between the safe and a law enforcement agency or personnel 206. Contact between the safe and a law enforcement agency assumes that the authorized access to the safe was in response to an emergency for which assistance from a law enforcement agency is desired. Thus, the sensor or safe may be configured to automatically contact a law enforcement agency thereby allowing the authorized user to confront the emergency situation without needing to personally contact law enforcement.

Where the access parameter input does not match a pre-registered access parameter, the locking mechanism of the safe is not released. Rather, in some embodiments contact between the sensor or safe and an authorized user is initiated 208. For example, the safe may send a text message, an email message, or contact the authorized user by phone to indicate that an unauthorized attempt was made to access the safe. The user may then contact law enforcement and/or personally check the status of the safe.

In other embodiments, the safe or sensor further initiates contact with law enforcement. Contact between the safe and law enforcement assumes that the unauthorized attempt to access to the safe is part of a crime for which assistance from law enforcement is desired. Contact between the safe and law enforcement may further assume that the unauthorized attempt to access the safe was by an unsupervised child, for which assistance from law enforcement is desired.

In some embodiments, an unauthorized attempt to access the safe further results in capture and storage of the access parameter input for later retrieval and analysis. For example, where an unauthorized user attempts to scan their fingerprint via biometric sensor 102, the image of the unauthorized user's fingerprint is stored by sensor 102 for later analysis. In some instances, the stored biometric data is automatically sent to law enforcement to assist the law enforcement personnel in responding to the alert. The safe may further emit an audible and/or visual alert in response to an unauthorized attempt to access the safe.

Some aspects of the present invention further provide a firearm safe system having a collapsible wall for storing a firearm, the safe comprising a sensor and comprising a computer-executable program having computer-executable instructions for 1) receiving an access parameter; 2) determining a permission of the access parameter; 3) providing access to a pre-registered access parameter; 4) denying access to an unauthorized access parameter; 5) contacting at least one of an authorized user and a law enforcement personnel in response to receiving an unauthorized access parameter; and 6) contacting the law enforcement personnel in response to receiving a pre-registered access parameter.

In some embodiments, support surface 106 of safe 100 further comprises a firearm stand 300 for holding a firearm 320 in a ready position within the interior space 106, as shown in FIGS. 8A and 8B. Firearm stand 300 may include any features, structures and surfaces to support and hold firearm 320 in a ready position. In some embodiments, formable ballistics gel is used to hold the ends of a weapon in the desired position. This would also provide the benefit of containing a potential misfire from the firearm as well as providing structural support for the firearm within the safe 100. As used herein, the term "ready position" suggests an orientation of a firearm that allows a user to quickly and easily grab, aim and fire the firearm, while requiring minimal user adjustment. For example, firearm stand 300 comprises a retaining mechanism 302 which suspends the firearm in a ready position within the air. For example, retaining mechanism may include a post which inserts within the barrel of firearm 320 to suspend the handle of firearm 320 in the air. As such, a user need only grasp the handle of firearm 320 and remove the gun from post 302. Following use of firearm 320, the firearm 320 is replaced onto post 302 to resume it ready position.

Retaining mechanism 302 may include any structure, configuration and size necessary to facilitate mounting of a firearm within safe 100 in a ready position. For example, retaining mechanism 302 may include a stirrup having an opening or catch for receiving a supporting a portion of the firearm. The retaining mechanism 302 may further include a hook, a clip, a catch, a sleeve, a cleat, an aperture, a moldable material, or any combination thereof which is capable of holding the firearm in a desired position. Retaining mechanism 302 may further be attached to any surface or surfaces of safe 100 which are needed to hold firearm 320 in a desired position. Retaining mechanism 302 may further comprise a separate device or structure which is temporarily or permanently coupled to support surface 106.

Figure 9A:
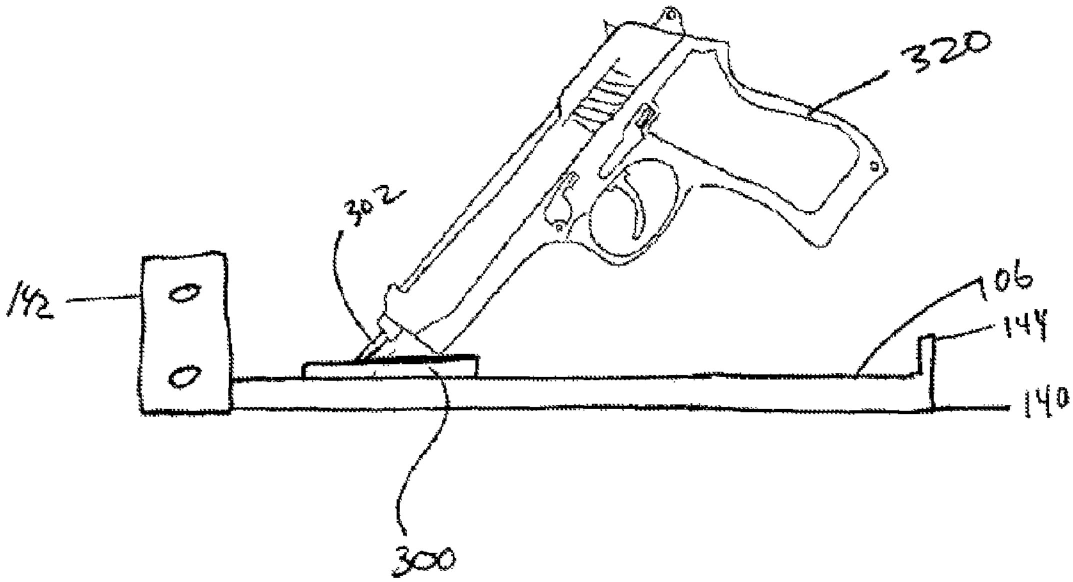
FIG. 9, shown in parts A and B, shows an isolated base of a firearm safe of the present invention having a firearm stand for holding a handgun in a ready position in accordance with a representative embodiment of the present invention.
Figure 9B:
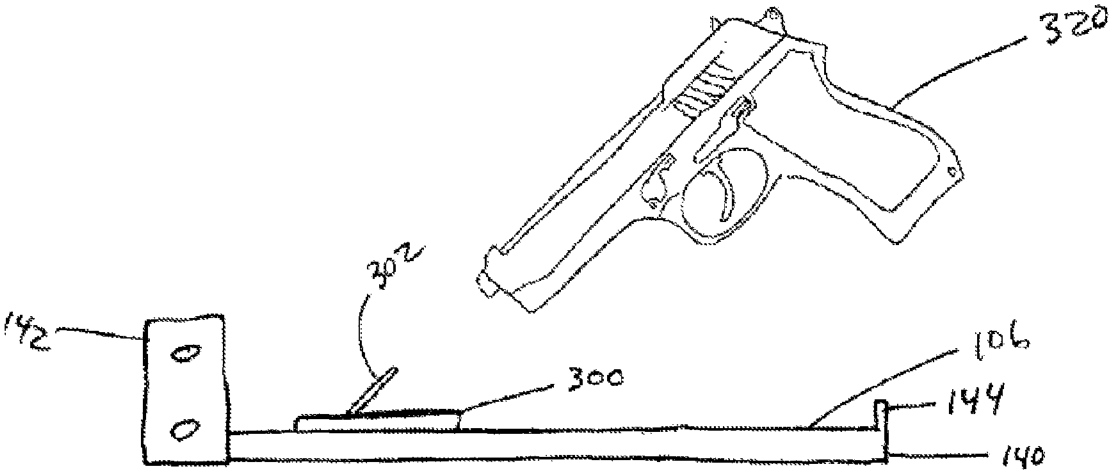
Figure 10A:
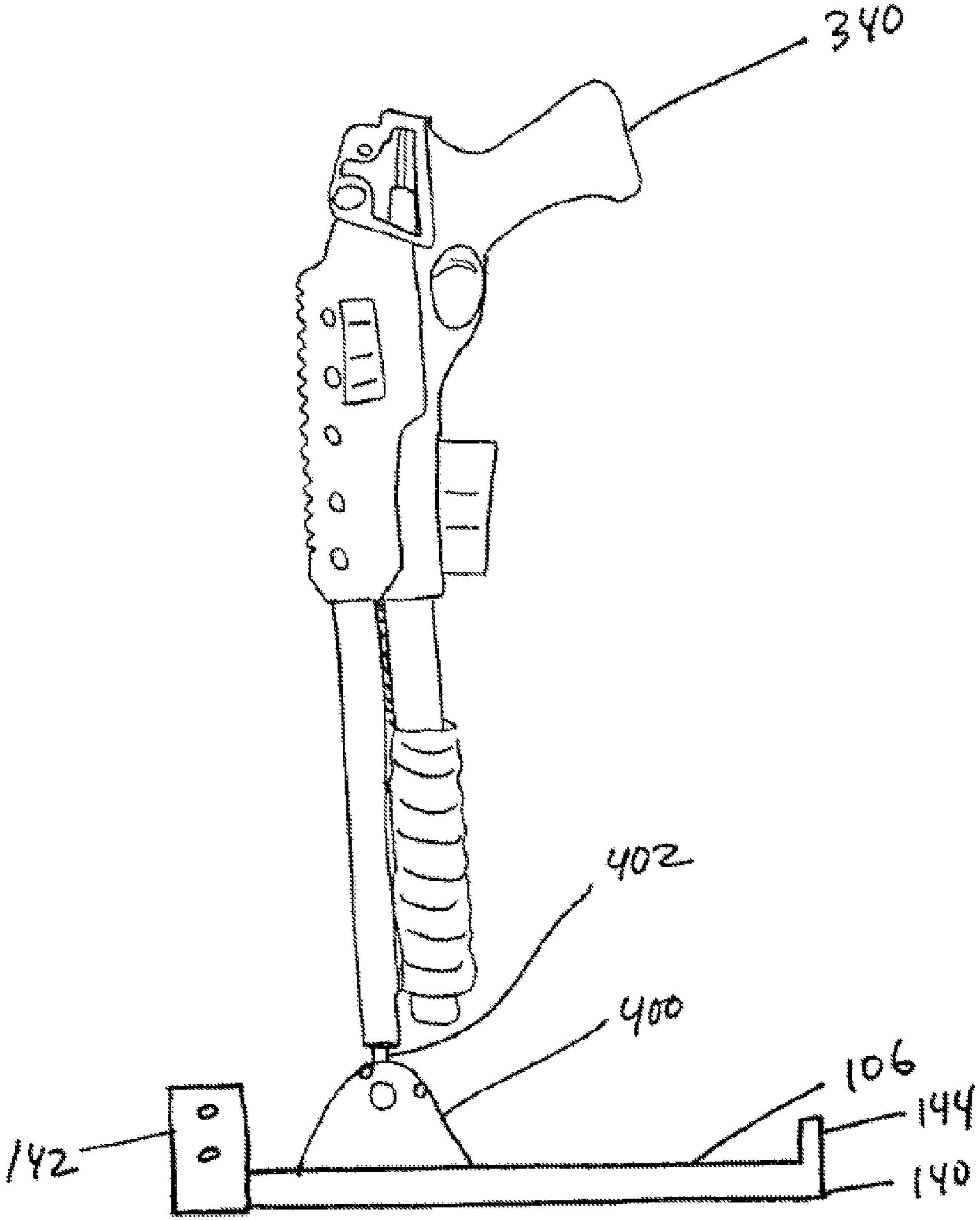
FIG. 10, shown in parts A-C, shows an isolated base of a fire arm safe of the present invention having a firearm stand for holding a rifle or shotgun in a ready position in accordance with a representative embodiment of the present invention.
Figure 10B:
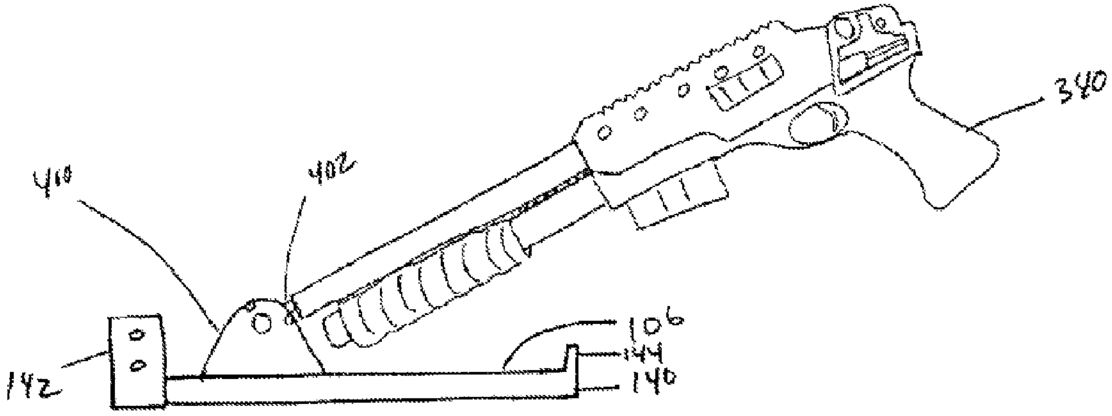
Figure 10C:
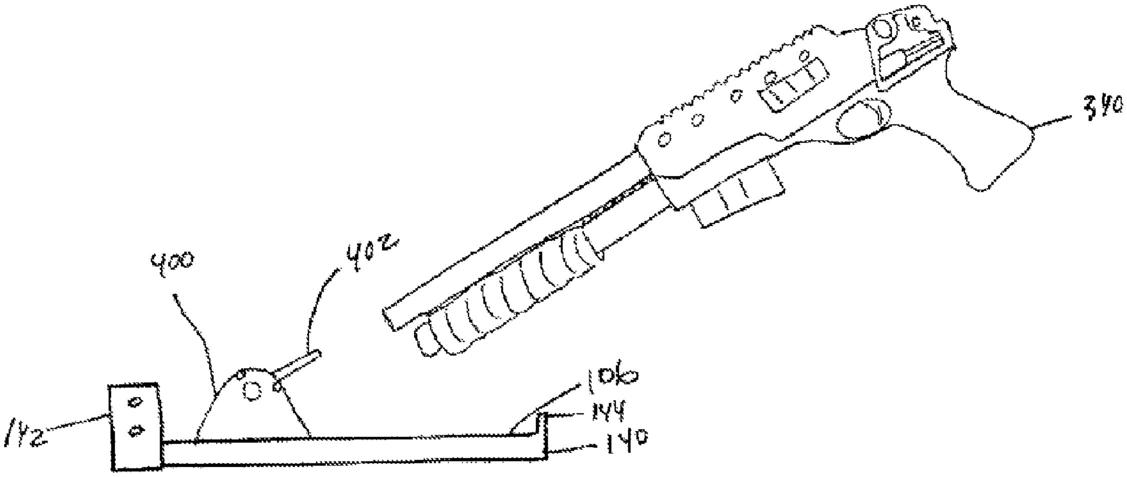

With reference to FIGS. 9A-9C, a firearm stand 400 is shown for use with a rifle or other long firearm 340. A ready position for a rifle requires that the barrel of the firearm 340 be approximately 45 degrees to support surface 106. Storing a rifle in a ready position with the system shown in FIGS. 8A and 8B would require that base 140 be excessively large to accommodate for the length of firearm 340. Accordingly, in some embodiments firearm stand 400 comprises a pivoting post 402 which pivots between a stored position, shown in FIG. 9A, and a ready position, shown in FIGS. 9B and 9C. As collapsible walls 110 are released or retracted, post 402 moves to the ready position, as shown in FIG. 9B. The user may then easily and quickly remove firearm 340 from post 402, as shown in FIG. 9C. Following use of firearm 340, the firearm 340 is replaced onto post 302 and moved into the stored position, as shown in FIG. 9A.

Figure 11:
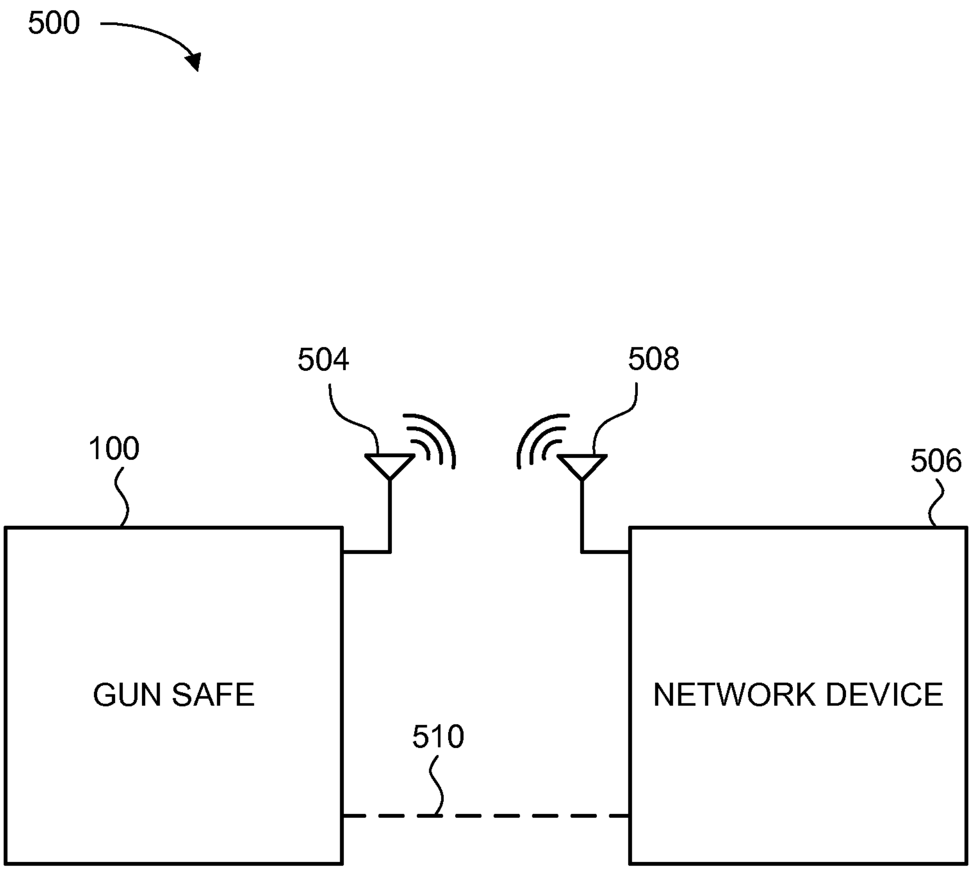
FIG. 11 shows a schematic drawing of one embodiment of a gun safe in communication with a network device.

FIG. 11 shows a schematic drawing 500 of one embodiment of a gun safe 100 in communication with a network device 506. In the illustrated embodiment, the gun safe 100 includes a communication structure 504. In the illustrated embodiment, the communication structure 504 is an antenna. In some embodiments, the communication structure 504 may be another structure capable of sending and receiving communications. For example, the communication structure 504 may be capable of sending and receiving communications in the form of radio wave, RFID, WiFi, near-field, far-field, Bluetooth, infrared, or other types of communication. In some embodiments, the devices may communication using a primary communication type (i.e. WiFi) with a secondary or backup communication type (i.e. SIM or cellular network) available in the case of a loss of the primary.

In the illustrated embodiment, the network device 506 includes a communication structure 508. In some embodiments, the communication structure 508 of the network device 506 is configured to send and receive the same communication types as those handled by the communication structure 504 of the gun safe 100. In other embodiments, the communication structure 508 of the network device 506 may be capable of handling more than one communication type.

In one embodiment, the network device 506 is a smart device. In another embodiment, the network device 506 is a central processing device. In some embodiments, the network device 506 is dedicated to communication with the gun safe 100. In other embodiments, the network device 506 is a general use device set up to communicate with the gun safe 100. For example, the network device 506 may be a smart phone, a personal computer, or a mobile or web app accessible to an external device. In some embodiments, the network device 506 may facilitate remote configuration of settings and control of the gun safe 100.

The illustrated embodiment also includes wired connection 510. In some embodiments, the gun safe 100 may communicate with the network device 506 via a wired or hard connection 510. In some embodiments, the gun safe 100 and the network device 506 may omit the wireless communication structures 504 and 508 and communicate solely via the wired connection 510. In another embodiment, the wired connection 510 is redundant to the communication structures 504 and 508. For example, the devices 100 and 506 may communicate primarily via wireless and rely on the wired connection 510 when wireless communication is unavailable or insufficient and vice versa. In another embodiment, certain information is communicated via the wired connection 510 while other information is communicated via the communication structures 504 and 508. Other embodiments may include fewer or more manners and structures to accommodate fewer or more avenues for communication to provide more or less redundancy.

Figure 12:
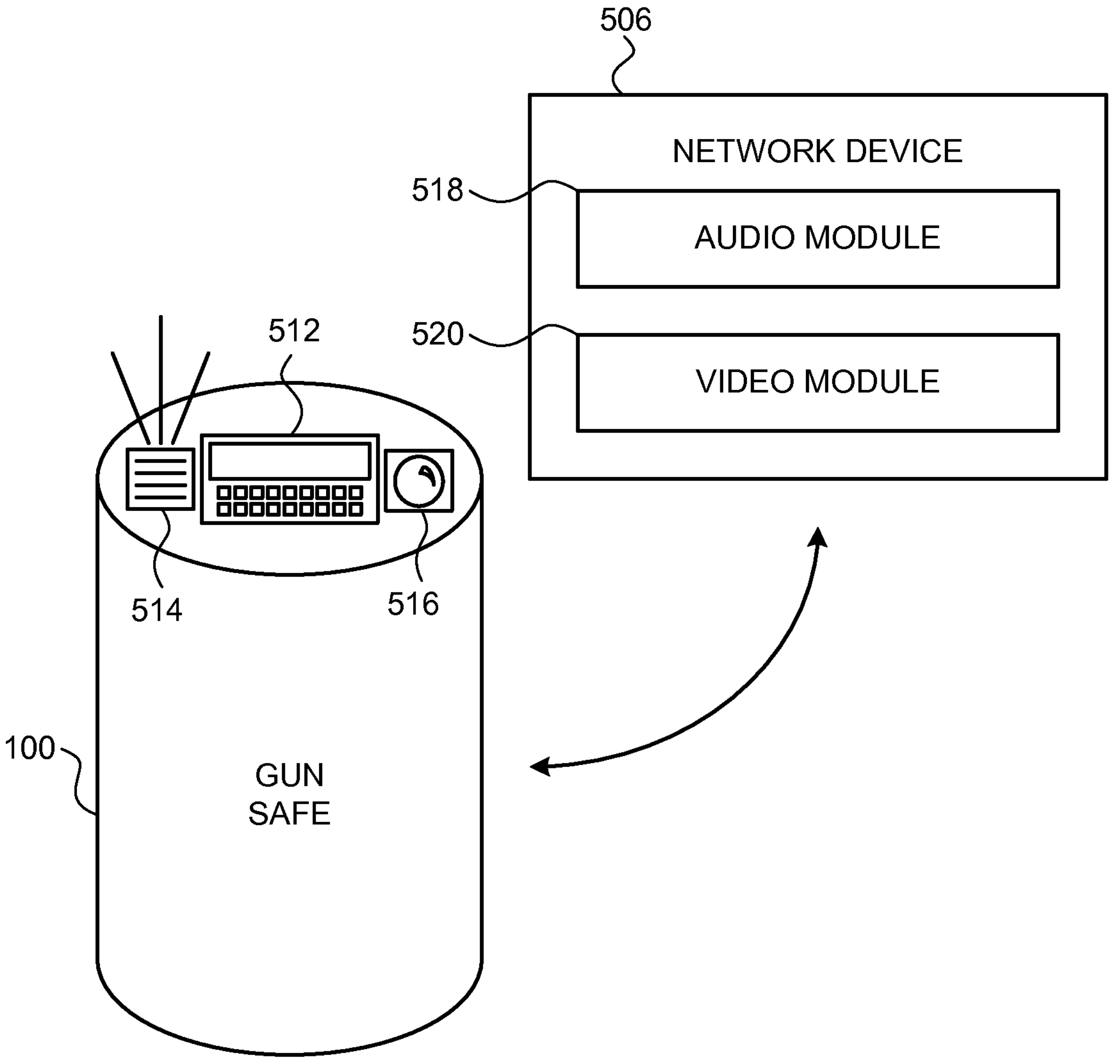
FIG. 12 shows a schematic diagram of one embodiment of a gun safe with an interface in communication with a network device.

FIG. 12 shows a schematic diagram of one embodiment of a gun safe 100 with an interface 512 in communication with a network device 506. The gun safe 100 and the network device 506 are in communication as discussed above with relation to FIG. 11. In the illustrated embodiment, the gun safe 100 includes an interface 512. The interface 512 is a portion of the safe 100 that facilitates entry of a passcode or other identifying information to allow access to the safe 100. For example, the interface 512 may be a fingerprint scanner or other biometric reader or recognition system. The interface 512 may be a keypad to recognize a series of numbers or pattern of key presses. The interface 512 may be a touch screen or camera to recognize a gesture or allow for input of other identifying information such as a biometric. In another embodiment, the interface 512 may include a signal identifier to transmit and/or receive a signal input or query/response. The interface 512 may include other systems for receiving identifying information or a combination of a plurality of systems.

In the illustrated embodiment, the interface 512 may facilitate local storage of access parameters. The interface 512 may then compare an input with the access parameters to allow a corresponding level of access to the gun safe 100. In some embodiments, the access parameters may be arranged in levels of access for a single safe 100. For example, the owner may assign a certain input access to the whole safe 100 while another input only gains access to a portion of the safe 100. This aspect of the invention is discussed in more detail below.

In another embodiment, the interface 512 may communicate with the network device 506 to verify an input against access parameters stored at the network device 506. The gun safe 100 may also include audio and video components 514 and 516. In some embodiments, the audio and video components 514 and 516 of the safe 100 facilitate recording of audio and video and at the safe 100. In another embodiment, the audio and video components 514 and 516 facilitate playing of audio and/or video pre-recordings or streaming of audio and/or video from the network device 506 or home security or audio/visual systems. In the illustrated embodiment, the network device 506 includes and audio module 518 and a video module 520. The audio and video modules 518 and 520 facilitate audio and video monitoring of audio and video recorded at the safe 100 and communicated to the network device 506. In some embodiments, the network device 506 stores the audio and video information recorded at the safe 100. In other embodiments, the network device 506 streams the audio and video from the safe 100 on demand or in response to a stream condition. For example, the user may specify that the network device 506 record the audio and visual information in response to detection of a tamper condition at the safe 100. The user may specify that the network device 506 record the audio and video in response to the audio reaching a certain dB level or in response to an input at the safe 100 or other qualifying condition. In another embodiment, the network device 506 may facilitate control of the audio and video modules 518 and 520. For example, the user may use the network device 506 to control the angle and direction of a camera of the video module 520. A user may also select a daytime or nighttime setting. The user may activate a low-light or motion detection setting. Other modes or settings may be incorporated. Additionally, these modes may initiate automatically upon detection of a given setting or condition.

In one embodiment, the network device 506 facilitates a playback of a recorded audio and/or video file at the safe 100. In another embodiment, the network device 506 facilitates a user communicating his or her voice and/or image from the network device 506 to the gun safe 100. For example, if the user noticed on the network device 506 that her child was playing with the safe, the user might speak into the network device 506 to communicate her voice over the audio component 514 of the gun safe 100 to warn her child not to tamper with the safe 100. Other functionality may be achieved through video and audio communication between the gun safe 100 and the network device 506. In some embodiments, the safe 100 may initiate a lockdown state. In one embodiment, the user may initiate the lockdown state from the network device 506. In another embodiment, the safe 100 may initiate the lockdown state in response to a condition detected at the safe 100. For example, a maximum number of failed attempts to access the safe 100 may cause the safe to lockdown. The user may lockdown the safe 100 to lockdown because she noticed that her child has begun to play with or around the safe. The lockdown state may be characterized by a delay between opportunities to input the correct access parameter. The lockdown state may require a specific code or detection of a specific unlock signal. The lockdown state may include communication to emergency services. The lockdown may include other types of actions.

Figure 13:
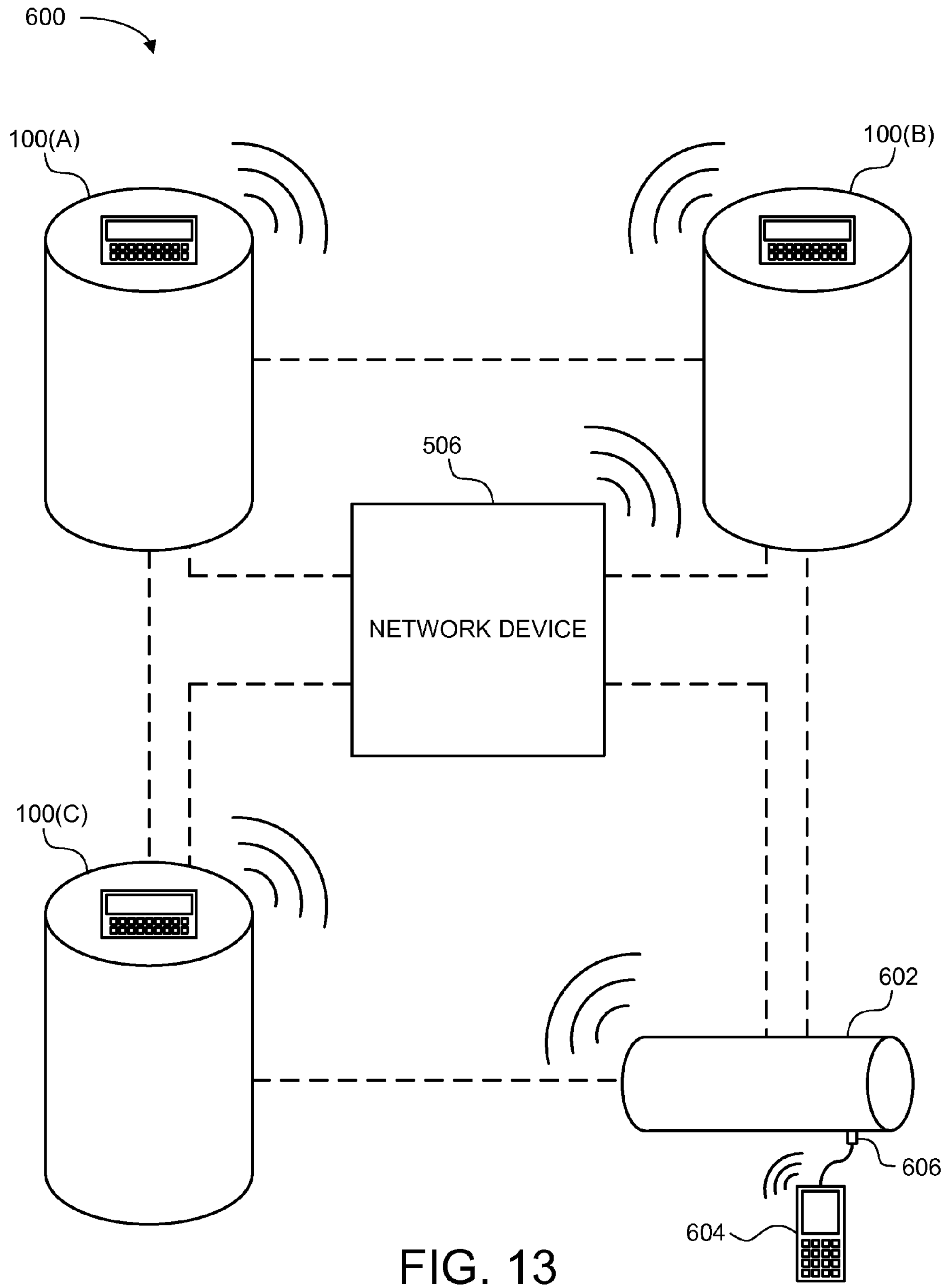
FIG. 13 shows a schematic diagram of one embodiment of a network of gun safes with a network device.

FIG. 13 shows a schematic diagram of one embodiment of a network 600 of gun safes 100(A-C) and 602 with a network device 506. The illustrated embodiment includes a plurality of gun safe 100(A-C) and 602 in a network 600. As described above, the network 600 may include wireless or wired communication. In the illustrated embodiment, the safes 100(A-C) and 602 are connected to the network device 506 and to one another. In some embodiments, the each of the safes 100(A-C) are in communication with each other. In some embodiments each of the safes 100(A-C) and 602 are individually connected only to the network device 506. In some embodiments, multiple safes 100(A-C) and 602 may be added and removed from the network 600. In some embodiments, the network device 506 detects the removal and introduction of a safe into and out of a communication range of the network 600. In some embodiments, if a safe is introduced into the network 600, the network device 506 detects the introduced safe and configures the safe for operation within the network 600. For example, the network device 506 may transmit the access parameters to the introduced safe. The network device 506 may also place the introduced safe in independent communication with one or more safes currently within the network 600.

In some embodiments, the network device 506 acts as a bridge to connect all of the safes 100(A-C) and 602. In one embodiment, the network device 506 may send out lockdown commands to one or more of the safes 100(A-C) and 602 upon detection of a condition at one or more of the safes 100(A-C) and 602 which has detected a lockdown condition. In another embodiment, the network device 506 may monitor video and/or audio at one or more of the safes 100(A-C) and 602. In some embodiments, the network device 506 may play a sound at one of the safes 100(A-C) and 602 in response to detection of a tamper condition at another of the safes to distract or confuse the individual tampering with the safe. In another embodiment, the network device 506 may play a warning sound at all of the safes 100(A-C) and 602 in response to detection of a tampering at one or more of the safes. In another embodiment, the network device 506 may cause a home sound system to play a warning sound or notification over a home audio system to alert occupants of a detected tampering.

In some embodiments, the network device 506 may maintain a hierarchy of access parameters for each of the safes 100(A-C) and 602. For example, the network device 506 may maintain an access parameter which grants full access to each of the safes 100(A-C) and 602. Another access parameter may grant full access to some of the safes 100(A-C) and 602 and partial access to the others. Another access parameter may grant full access to a single safe. In some embodiments, a given access parameter may require input of multiple inputs to grant access. For example, an access parameter may require presentation of an RFID signal in conjunction with a sequence or biometric. Other arrangements of access parameters and levels of access may be incorporated.

For example, the communication module of the gun safe 100 or portable safe 602 may determine an appropriate access parameter for accessing the firearm based on multiple access variables. For example, some of the variables may include the time of day, the physical location of the safe, what user is attempting to access the safe, network connectivity, lockdown state, emergency state, a user specified condition, a power state of the safe, or other variable. Some embodiments may implement fewer or more variables.

In some embodiments, an access parameter may be established based on a specific variable. For example, if the time is between 9 am to 10 pm (daytime), the access parameter will be set at a particular input (such as a fingerprint and a passcode). From 10 pm to 9 am (nighttime), the access parameters may change to require only a fingerprint. This may allow for quicker access based on a desired access speed or level of security.

Other variables such as the location of the safe may also change the access parameters for the safe. For example, if the user has taken the safe to the range to use the firearm, the access parameters may require a signal from a user device to grant access. While at home the safe may only require a touch pattern be entered.

In some embodiments, the access parameters may adjust based on who is attempting to access the firearm. For example, if the husband is identified by a finger print or other biometric, the safe may also require a pattern of inputs. The wife may be granted access simply by providing a voice pattern. Other variables such as facial recognition or other quick access features may be implemented.

In another embodiment, the safe may adjust the access parameters based on a network connectivity state. For example, if the safe is connected to a recognized home network, a certain set of access parameters will grant access to the firearm. If, however, the safe is out of range of the home network or the network goes down, a different set of access parameters may be used. The network connectivity state may also include a variable for a type of network. For example, a certain access parameter may be required for a wired or wireless connection. Specific types of each connection may also be used. Each type of connection may communication a certain distance between the safe and another networked device. For example, a "wired" or "tethered" connection or even Bluetooth connectivity may imply a connection between 0-10 m proximity. This closer proximity adds a corresponding level of security. If only connected by GSM- or cellular network a lower level of security is assumed because such a connection can be established over relatively large distances. A corresponding access parameter may be required to access the safe. Other examples include: Mag-strip (1 cm), RFID (1-6 cm), IrDA (1 cm-1 m), Bluetooth (1 cm-5 m indoor, 30 m outdoor), Z-Wave (1 cm-30 m open air), HomeRF (1 cm-50 m), Zigbee (1 cm-100 m line of sight), WiFI (1 cm-32 m indoors, 95 m outdoors)→Spread Spectrum (Clear) 400 m, GSM/CDMA cellular (miles-WW)→Satellite (Iridium) unlimited. Based on the type of connection detected, the system may set a corresponding required level of access parameter.

In other embodiments, a user may manually override other parameters to prevent minors or other at-risk individuals from accessing the firearm by setting the safe into a state of lockdown. The lockdown state may require that a specific user enter an access parameter at the user device and then enter a parameter at the safe. In some embodiments, the user may manually elect the acceptable access parameters regardless of detected or programmed variables. In some embodiments, the user may select specific access parameters. In other embodiments, the user may select to generally decrease or increase the complexity of the required access parameter or increase or decrease the number of variables used to select the appropriate access parameter.

Another variable used to determine the appropriate access parameter may include detection of an emergency condition. For example, if the home security system is triggered, the safe may allow access with a simple detection of touch. Alternatively, if the user specifies that the home is unoccupied, triggering of the alarm system may put the safe into lockdown mode to prevent unauthorized access. In this example, multiple variables are used to determine the appropriate access parameter. Here, the state of the alarm and the occupancy of the house are both considered together to select the appropriate access parameter.

Another variable may be the current power state of the safe. For example, if the safe is connected to an AC power source, a certain level of access parameter may grant access to the safe. If connected to an external source, such as a portable power source, another access parameter may be needed. The safe may also include an internal battery for portability or in case of local power outage or failure. If it is detected that the internal battery is in use, yet another access parameter may be required to provide a corresponding level of security.

In some embodiments, the access parameters may be determined by a combination of two or more variables. For example, if it is a certain time of day, the safe is located on the home network, and the attempted access is from a specific user, a certain access parameter will be acceptable. Other embodiments may include other arrangements for selecting the appropriate access parameter. Other embodiments may also include other schemes using different combinations or levels of access requirements to secure a firearm.

In some embodiments, the variables described above may be detected by the safe itself or communicated to the safe by a central device, the user device, or another device in communication with the safe. The detected variables may be stored on the safe or stored remotely. The format for storing the variables may include a lookup table, a multi-dimensional matrix, or other storage arrangement.

In some embodiments, the access parameters may be selected based on an algorithm which takes in one or more of the variables. The algorithm may prioritize one variable over another. In some embodiments, the user may select which variables to prioritize in selecting the appropriate access parameters. In another embodiment, the user may also select one or more variables to ignore or remove from the algorithm. Other embodiments may allow for additional functionality in considering and selecting variables.

The variables and corresponding access parameters may be updated periodically or in response to an access attempt. In some embodiments, the variables and access parameters may be updated based on a detected change in one or more of the variables. For example, the safe may trigger a variable update when the power source is changed, when a movement of the safe is detected, when the safe is removed from or connected to a network, when a physical, audio, or visual input is detected, or when a user makes an update request. The system may also update the appropriate access parameters upon determination that a variable has been updated. Other update or variable detection triggers may be implemented.

The illustrated embodiment includes a portable gun safe 602. In one embodiment, the portable gun safe 602 is a version of the gun safe 100 which is configured to be placed inside the gun safe 100 and removed for transport to a firing range or other location for use of the firearm without exposing the firearm during transit. In one embodiment, the portable gun safe 602 is made of a composite material and facilitates both storage of the firearm and transportation of the firearm. In one embodiment, the portable gun safe 602 includes a communication module (not shown). The communication module may be powered internally or require an external power source. In one embodiment, the communication module communicates with a smart device 604 to allow a user to access the portable gun safe 602. In some embodiments, the smart device 604 is physically connected to the portable gun safe 602. In other embodiments, the smart device 604 and the portable gun safe 602 communicate wirelessly. In one embodiment, the portable gun safe 602 benefits from the security of the safe 100 while docked or stored within the safe 100. In another embodiment, the portable gun safe 602 may be docked in a smart dock (not shown) to provide power, accessibility, and additional security described above as associated with the gun safe 100. The portable gun safe 602 may be removed from the gun safe 100 or smart dock and connected to a smart device 604 via wireless communication or via a wired connection 606. In some embodiments, the portable gun safe 602 includes an internal communication module but in some embodiments, the portable gun safe 602 has no internal communication module; the smart device 604 then functions as the interface device 512 to act as a communication module for the portable gun safe 602. In some embodiments, the portable gun safe 602 allows access to the firearm upon appropriate input of an access parameter at the smart device 604. In some embodiments, the smart device 604 functions as a tracking module for the portable gun safe 602. While the portable gun safe 602 is described as portable, this does not suggest that the gun safes 100 are not portable.

Figure 14:
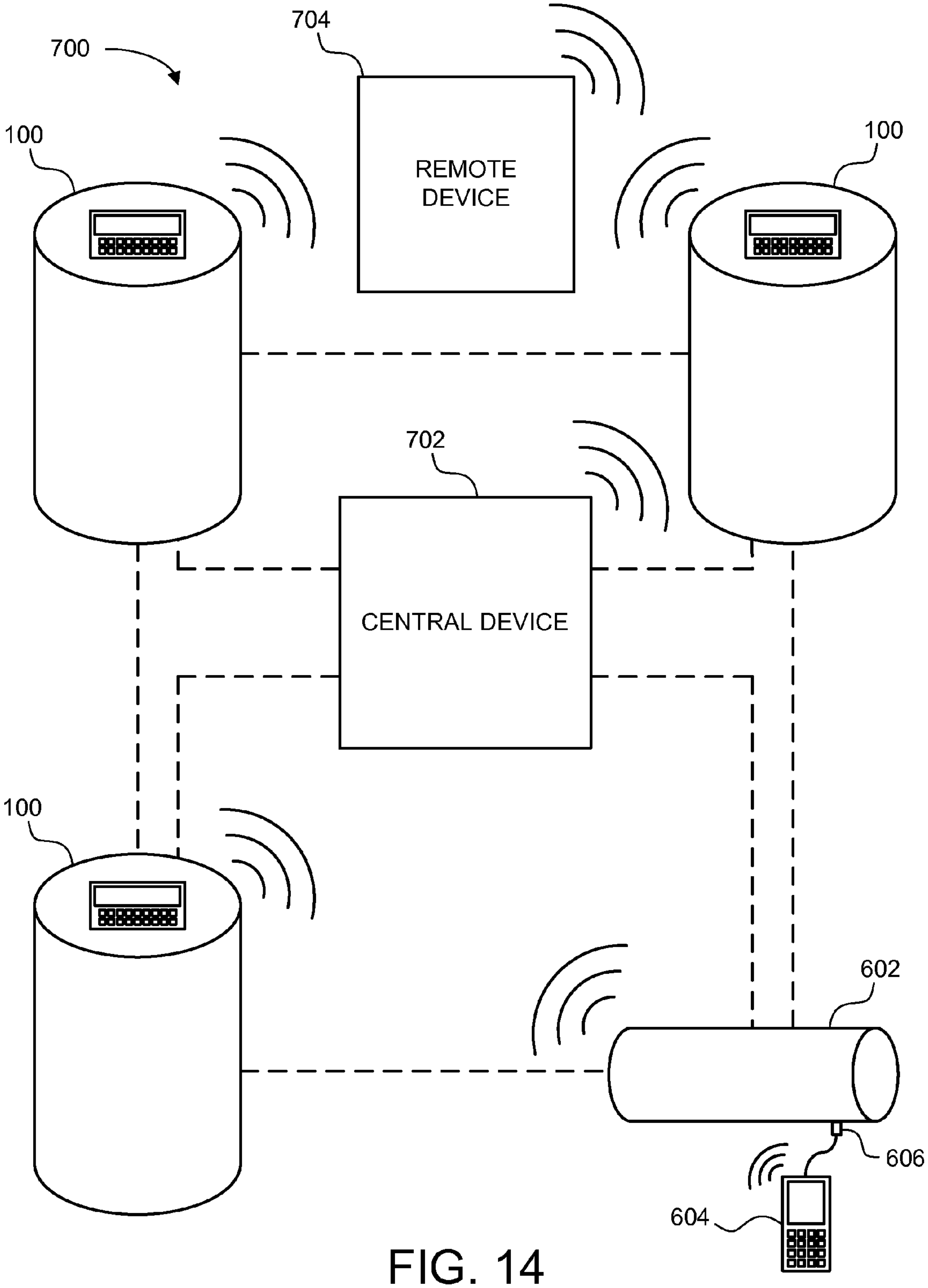
FIG. 14 shows a schematic diagram of one embodiment of a network of gun safes with a central device and a remote device.

FIG. 14 shows a schematic diagram of one embodiment of a network 700 of gun safes 100 and 602 with a central device 702 and a remote device 704. In the illustrated embodiment, the central device 702 is a dedicated bridge to act as a communication hub for the network 700. The central device 702 may connect to a local WiFi or other network or generate an independent network. The central device 702 may include an independent power source to provide power in the event of a power outage. In some embodiments, the central device 702 is an integrated home security system. The illustrated embodiment also includes a remote device 704. In some embodiments, the remote device 704 is a smart device in communication with the central device 702. In another embodiment, the remote device 704 may also be in independent contact with each of the safes 100 and 602. In some embodiments, the central device 702 may push communications to the remote device 704. For example, the central device 702 may alert the remote device 704 or an access attempt (successful or failed), a tamper detection, removal or addition of a safe from or into the network 700 or other event within the network 700. Other functionality and interaction may be incorporated with the remote device 704. In the embodiments described herein, the remote device 704, the central device 702, and the network device 506 may constitute separate or singular components.

Figure 15:
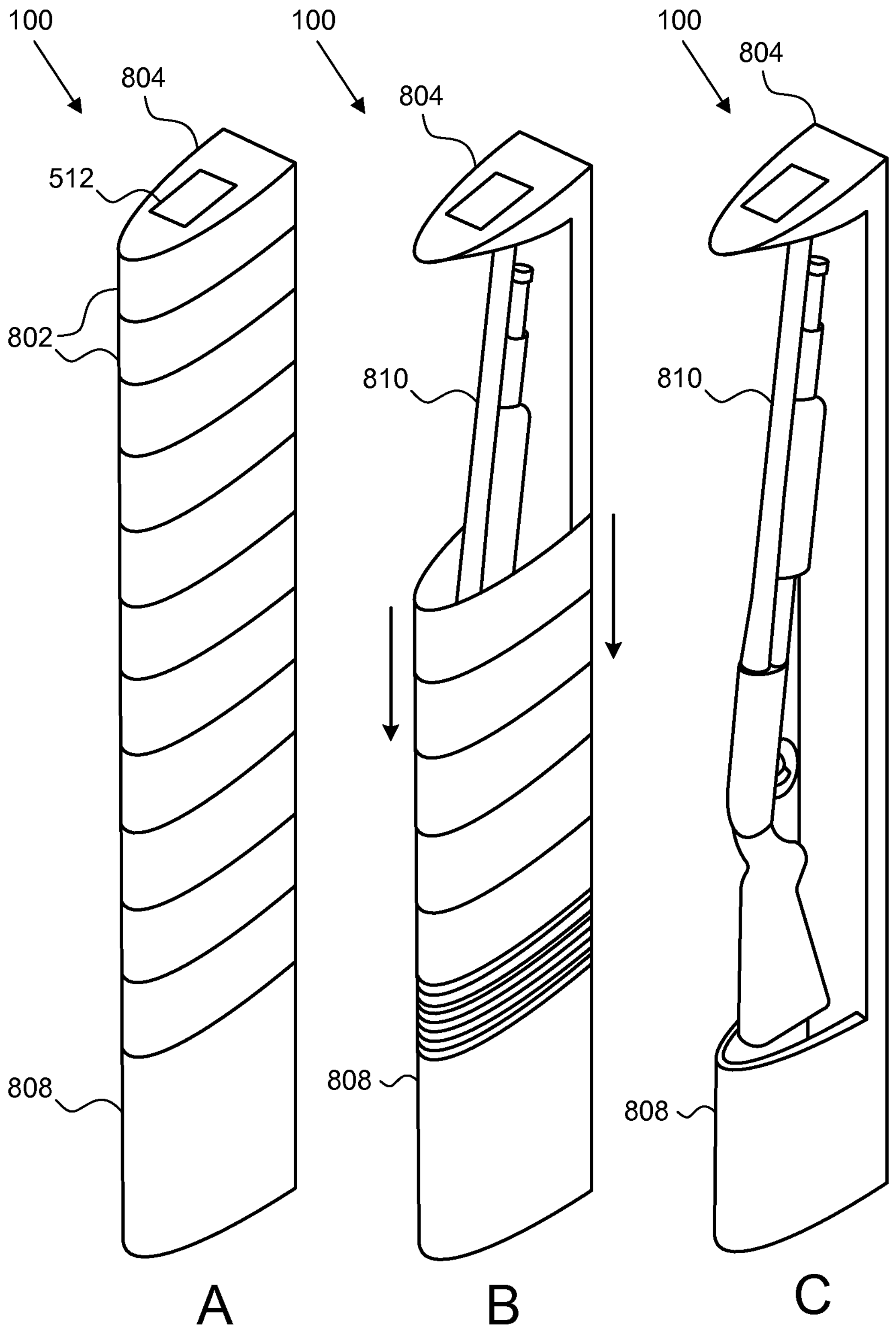
FIG. 15 shows three diagrams of one embodiment of a gun safe with a stored firearm.

FIG. 15 shows three diagrams (A, B, and C) of one embodiment of a gun safe 100 with a stored firearm 810. In the illustrated embodiment, diagram A depicts the gun safe 100 with the collapsible wall sections 802 in a closed position. In one embodiment, the wall sections 802 interlock to form a relatively strong and tamper-resistant barrier for protection and storage of a firearm 810. In one embodiment, the upper portion of the wall sections 802 is held in the closed position by a locking mechanism located in the cap 804. The cap 804 may also include the interface 512. The lower portion of the wall sections 802 is secured within the base 808. The nested configuration of the wall sections 802 allows for integrity of the entire set of collapsible wall sections 802 to be secure as the individual wall sections 802 bind together.

Diagram B depicts one embodiment in which the wall sections 802 collapse down in a nesting manner to provide access to the stored firearm 810. In some embodiments, the wall sections 802 collapse in a downward direction into the base 808. In some embodiments, the wall sections 802 may be retracted into the cap 804. In some embodiments, the wall sections 802 collapse under a mechanical force. For example, the mechanical force may be provided by a spring, magnet, pneumatic, or other system capable of exerting force. In other embodiments, the wall sections 802 collapse under the force of gravity. In another embodiment, the wall sections 802 collapse under a mechanical force in combination with or aided by the force of gravity.

Diagram C depicts one embodiment in which the wall sections 802 have been completely collapsed into the base 808. The firearm 810 is now completely accessible to the user. In some embodiments, the firearm 810 is held in a ready or zero-gravity position which allows the user a wide angle from which to access the firearm 810. In some embodiments, the firearm 810 is mounted within the safe 100 at an upper point near the cap 804. In another embodiment, the firearm 810 is mounted within the safe 100 near a middle or breach portion of the firearm 810. In another embodiment, the firearm 810 is mounted within the safe 100 near the butt of the firearm 810. In the illustrated embodiment, the firearm 810 is mounted within the safe 100 with the barrel upwards and the trigger turned inward into the safe 100. Other embodiments facilitate mounting the firearm 810 in a variety of different orientations. For example, the firearm 810 may be mounted barrel downward with the trigger facing outward from the safe 100. The firearm 810 may also be oriented so that the barrel points upward with the trigger turned outward. Alternatively, the barrel may point downward with the trigger turned inward. Some embodiments facilitate multiple orientations of the firearm 810. While particular aspects of the safe 100 are illustrated and described with reference to FIG. 14 and the previous figures, some embodiments may include fewer or more components and less or more functionality.

Figure 16:
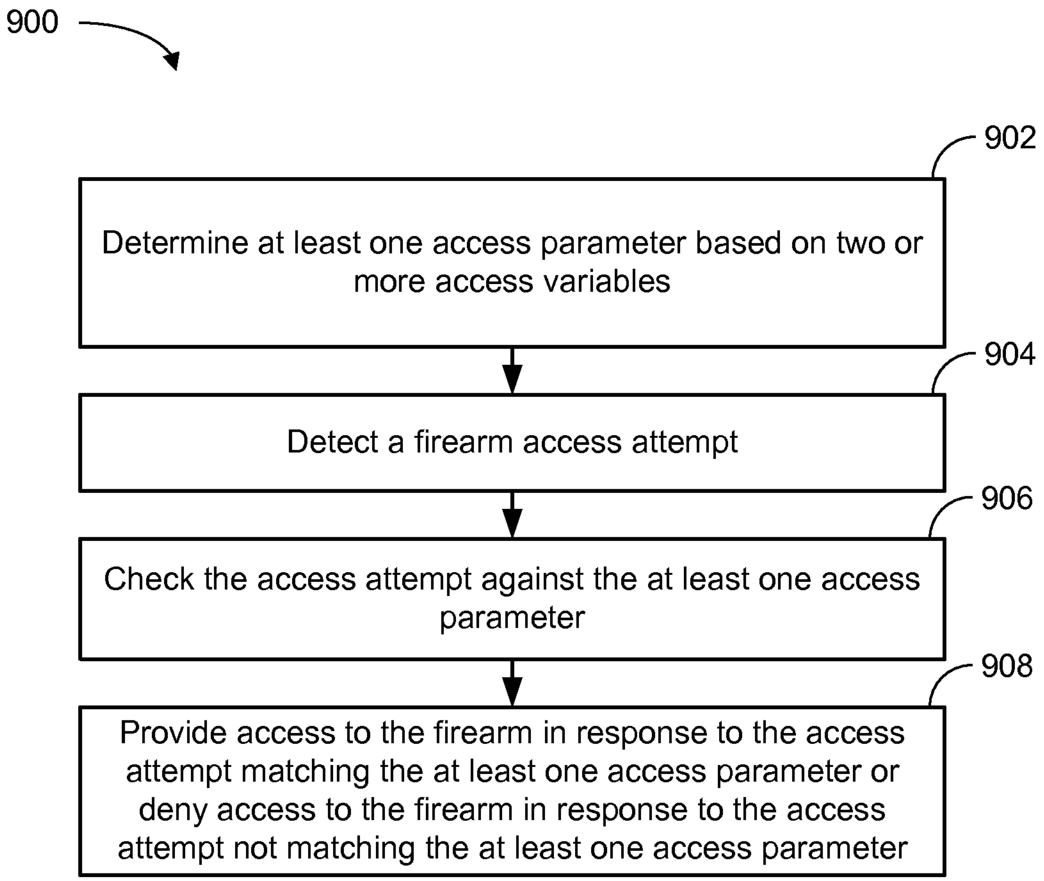
FIG. 16 shows a flow chart diagram of one embodiment of a method for securing a firearm.

FIG. 16 shows a flow chart diagram of one embodiment of a method 900 for securing a firearm. At block 902, at least one access parameter is determined based on two or more access variables. At block 904, a firearm access attempt is detected. At block 906, the access attempt is checked against the at least one access parameter. At block 908, access to the firearm is provided in response to the access attempt matching the at least one access parameter or access is denied.

Although the operations of the method herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

It should also be noted that at least some of the operations described herein may be implemented using software instructions stored on a computer useable storage medium for execution by a processor. As an example, an embodiment of a computer program product includes a computer useable storage medium to store a computer readable program that, when executed on a computer, causes the computer to perform operations, including an operation receive, store, verify, and reject or accept an input access parameter. In one embodiment, operations to interact with the gun safe may be carried out via a web portal, smart device, central device, network device, or dedicated interface using software instructions. In a further embodiment, operations are included in managing a network of two or more devices described herein. Embodiments of the invention can take a form containing both hardware and software elements.

Furthermore, embodiments of the invention can take the form of a device accessible from a computer-usable or computer-readable medium providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device.

Input/output or I/O devices for input of an access parameter (including but not limited to keyboards, displays, touch interfaces, antennas, user-specific electronic or biometric readers, etc.) can be coupled to the system either directly or through intervening I/O controllers. Additionally, network adapters also may be coupled to the system to enable components of the network to become coupled to other data processing systems or remote devices or storage devices through intervening private or public networks. Modems, cable modems, and Ethernet cards are just a few of the currently available types of network adapters.

What is claimed is:

1. A gun safe comprising:

an enclosing structure to enclose a firearm in an interior space; and a computer device coupled to the enclosing structure, the computer device to electronically communicate with the enclosing structure and determine two or more outputs of at least two or more access variables of a safe and select, from a plurality of potential access parameters, at least one access parameter required from a user to access the interior space of the enclosing structure, wherein the selection of the at least one access parameter is based on the two or more outputs of the two or more access variables.

2. The gun safe of claim 1, wherein at least one access variable of the two or more access variables comprises a time variable, wherein an output of the time variable is one of the two or more outputs, wherein the output of the time variable is a time of day, and wherein the time of day determines the at least one access parameter selected from the plurality of potential access parameters.

3. The gun safe of claim 1, wherein at least one access variable of the two or more access variables comprises a location variable, wherein an output of the location variable is one of the two or more outputs, wherein the output of the location variable is a location of the safe, and wherein the location of the safe determines the at least one access parameter selected from the plurality of potential access parameters.

4. The gun safe of claim 3, wherein at least one access variable of the two or more access variables comprises a user variable, wherein an output of the user variable is one of the two or more outputs, wherein the output of the user variable is an identity of the user, and wherein the identity of the user determines the at least one access parameter selected from the plurality of potential access parameters.

5. The gun safe of claim 1, wherein at least one access variable of the two or more access variables comprises a network connection variable, wherein an output of the network connection variable is one of the two or more outputs, wherein the output of the network connection variable is a network connectivity state between the computer device and the enclosing structure, and wherein the network connectivity state determines the at least one access parameter selected from the plurality of potential access parameters.

6. The gun safe of claim 1, wherein at least one access variable of the two or more access variables comprises a manual lockdown variable, wherein an output of the manual lockdown variable is one of the two or more outputs, wherein the output of the manual lockdown variable is a lockdown state, and wherein the lockdown state determines the at least one access parameter selected from the plurality of potential access parameters, and wherein the lockdown state increases a number of the two or more access variables required to base the at least one access parameter.

7. The gun safe of claim 1, wherein at least one access variable of the two or more access variables comprises an emergency condition variable, wherein an output of the emergency condition variable is one of the two or more outputs, wherein the output of the emergency condition variable is an emergency condition state comprising the triggering of a home security system, and wherein the emergency condition state determines the at least one access parameter selected from the plurality of potential access parameters.

8. The gun safe of claim 1, wherein a number of access variables of the two or more access variables required to base the at least one access parameter decrease in response to an indication from the computer device.

9. The gun safe of claim 1, wherein a number of access variables of the two or more access variables required to base the at least one access parameter increase in response to an indication from the computer device.

10. The gun safe of claim 1, wherein the computer device is wired to the enclosing structure.

11. A method for securing a firearm, the method comprising:

determining two or more outputs of at least two or more access variables of a safe;

from a plurality of potential access parameters, selecting at least one access parameter, wherein the access parameter is required from a user to access the safe, wherein the selecting the at least one access parameter is based on the two or more outputs of the at least two or more access variables;

detecting a firearm access attempt;

checking the access attempt against the at least one access parameter;

providing access to the firearm in response to the access attempt matching the at least one access parameter or denying access to the firearm in response to the access attempt not matching the at least one access parameter.

12. The method of claim 11, wherein at least one access variable of the two or more access variables comprises a time variable, wherein an output of the time variable is one of the two or more outputs, wherein the output of the time variable is a time of day, and wherein the time of day determines the at least one access parameter selected from the plurality of potential access parameters.

13. The method of claim 12, wherein at least one access variable of the two or more access variables comprises a location variable, wherein an output of the location variable is one of the two or more outputs, wherein the output of the location variable is a location of the safe, and wherein the location of the safe determines the at least one access parameter selected from the plurality of potential access parameters.

14. The method of claim 11, wherein at least one access variable of the two or more access variables comprises a user variable, wherein an output of the user variable is one of the two or more outputs, wherein the output of the user variable is an identity of the user, and wherein the identity of the user determines the at least one access parameter selected from the plurality of potential access parameters.

15. The method of claim 11, wherein at least one access variable of the two or more access variables comprises a network connection variable, wherein an output of the network connection variable is one of the two or more outputs, wherein the output of the network connection variable is a network connectivity state, and wherein the network connectivity state determines the at least one access parameter selected from the plurality of potential access parameters.

16. The method of claim 11, wherein at least one access variable of the two or more access variables comprises a manual lockdown variable, wherein an output of the manual lockdown variable is one of the two or more outputs, wherein the output of the manual lockdown variable is a lockdown state, and wherein the lockdown state determines the at least one access parameter selected from the plurality of potential access parameters.

17. The method of claim 11, wherein at least one access variable of the two or more access variables comprises an emergency condition variable, wherein an output of the emergency condition variable is one of the two or more outputs, wherein the output of the emergency condition variable is an emergency condition state comprising the triggering of a home security system, and wherein the emergency condition state determines the at least one access parameter selected from the plurality of potential access parameters.

18. The method of claim 11, further comprising decreasing a number of access variables of the two or more access variables required to base the selecting the at least one access parameter in response to an indication from a user.

19. The method of claim 11, further comprising increasing a number of access variables of the two or more access variables required to base the selecting the at least one access parameter in response to an indication from a user.

20. The method of claim 11, wherein at least one access variable of the two or more access variables comprises a power state variable, wherein an output of the power state variable is one of the two or more outputs, wherein the output of the power state variable is a power state of the safe, and wherein the power state of the safe determines the at least one access parameter selected from the plurality of potential access parameters.

* * * * *